United States Patent
Ushigome

(10) Patent No.: US 10,133,084 B2
(45) Date of Patent: Nov. 20, 2018

(54) DIFFRACTIVE OPTICAL ELEMENT, OPTICAL SYSTEM, AND OPTICAL APPARATUS WHICH REDUCE GENERATION OF UNNECESSARY LIGHT

(71) Applicant: CANON KABUSHIKI KAISHA, Tokyo (JP)

(72) Inventor: Reona Ushigome, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 15/149,245

(22) Filed: May 9, 2016

(65) Prior Publication Data
US 2016/0334635 A1 Nov. 17, 2016

(30) Foreign Application Priority Data

May 15, 2015 (JP) .................................. 2015-099964
Apr. 21, 2016 (JP) .................................. 2016-084952

(51) Int. Cl.
*G02B 27/42* (2006.01)
*G02B 27/00* (2006.01)

(52) U.S. Cl.
CPC ..... *G02B 27/4272* (2013.01); *G02B 27/0018* (2013.01); *G02B 27/4261* (2013.01)

(58) Field of Classification Search
CPC .............. G02B 27/4272; G02B 27/42; G02B 27/4205; G02B 27/4211; G02B 27/4216; G02B 27/4261; G02B 27/4266; G02B 27/4288; G02B 27/0018
USPC .......................................... 359/574–576, 570
See application file for complete search history.

(56) References Cited

U.S. PATENT DOCUMENTS

2009/0141354 A1* 6/2009 Kobayashi ......... B29D 11/0073
359/571
2011/0304916 A1* 12/2011 Ushigome ............ G02B 5/1814
359/576
2014/0247492 A1 9/2014 Ushigome

FOREIGN PATENT DOCUMENTS

JP       2014170109 A    9/2014
WO       2011099550 A1   8/2011

OTHER PUBLICATIONS

Lohner et al. "Characterization of sputtered aluminum oxide films using spectroscopic ellipsometry", Jan. 1, 2015, NSP Natural Sciences Publishing Cor., Int. J. New. Hor. Phys. 2, No. 1, 1-4 (2015), pp. 1-4.*

* cited by examiner

Primary Examiner — Marin Pichler
(74) Attorney, Agent, or Firm — Rossi, Kimms & McDowell LLP

(57) ABSTRACT

A diffractive optical element (1) includes a first diffraction grating (21) including a first grating surface (21a) and a first grating wall surface (21b), a second diffraction grating (31) including a second grating surface (31a) and a second grating wall surface (31b), and a thin film (11) provided between the first grating wall surface and the second grating wall surface and being in contact with both of the first and second grating wall surfaces, an extinction coefficient of the thin film with respect to a wavelength λ in a use wavelength band is not greater than 0.0005, and with respect to the wavelength λ, refractive indices of materials of the thin film, the first diffraction grating, and the second diffraction grating, a relative diffractive index difference of the thin film and the first diffraction grating, and a width of the thin film satisfy predetermined conditions.

17 Claims, 29 Drawing Sheets

DIFFRACTIVE OPTICAL ELEMENT, OPTICAL SYSTEM, AND OPTICAL APPARATUS WHICH REDUCE GENERATION OF UNNECESSARY LIGHT

BACKGROUND OF THE INVENTION

Field of the Invention

The present invention relates to a diffractive optical element which reduces generation of unnecessary light.

Description of the Related Art

With respect to a diffractive optical element which is used in a lens of an optical system, two diffraction gratings are arranged to be firmly in contact with each other and a material and a grating height of each diffraction grating are appropriately set, and thus it is known that a high diffraction efficiency can be obtained with a wide wavelength band. When a light beam is incident on the diffractive optical element including a grating surface and a grating wall surface, unnecessary light (flare) occurs due to an influence of the grating wall surface even in an ideal diffractive optical element calculated according to a scalar diffraction theory.

International Publication No. WO2011/099550 discloses a diffractive optical element that uses an RCWA (Rigorous Coupled Wave Analysis) and that is provided with an optical waveguide on a grating wall surface portion to improve a diffraction efficiency of a designed order of an incident light beam at a designed incident angle. Japanese Patent Laid-open No. 2014-170109 discloses a diffractive optical element that is provided with a thin film on a grating wall surface portion to improve a diffraction efficiency of a designed order of an incident light beam at a designed incident angle to reduce the diffraction efficiency of ±1st order as designed orders to reduce unnecessary light that occurs by the incident light beam at an obliquely incident angle (off-screen light incident angle) reaching an imaging plane.

While the diffractive optical element disclosed in International Publication No. WO2011/099550 improves the diffraction efficiency of the designed order of the light beam incident at the designed incident angle, it is difficult to reduce the unnecessary light reaching the imaging plane caused by the light beam incident at the obliquely incident angle. The diffractive optical element disclosed in Japanese Patent Laid-open No. 2014-170109 is capable of improving the diffraction efficiency of the designed order of the light beam incident at the designed incident angle to reduce the diffraction efficiency of the ±1st order as designed orders to reduce the unnecessary light that occurs by the incident light beam at the obliquely incident angle reaching an imaging plane. However, the diffractive optical element disclosed in Japanese Patent Laid-open No. 2014-170109 has high wavelength characteristics and polarization characteristics, and accordingly it is difficult to have desired wavelength characteristics and polarization characteristics.

SUMMARY OF THE INVENTION

The present invention provides a diffractive optical element, an optical system, and an optical apparatus which reduce a wavelength dependence and a polarization dependence to have desired wavelength characteristics and polarization characteristics.

A diffractive optical element as one aspect of the present invention includes a first diffraction grating including a first grating surface and a first grating wall surface, a second diffraction grating including a second grating surface and a second grating wall surface, and a thin film provided between the first grating wall surface and the second grating wall surface, the thin film is in contact with both of the first and second grating wall surfaces, an extinction coefficient of the thin film with respect to a wavelength $\lambda$ in a use wavelength band is not greater than 0.0005, and with respect to the wavelength $\lambda$, refractive indices of materials of the thin film, the first diffraction grating, and the second diffraction grating, a relative diffractive index difference of the thin film and the first diffraction grating, and a width of the thin film between the first and second grating wall surfaces satisfy predetermined conditions.

An optical system as another aspect of the present invention includes an aperture stop and the diffractive optical element.

An optical apparatus as another aspect of the present invention includes the optical system.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
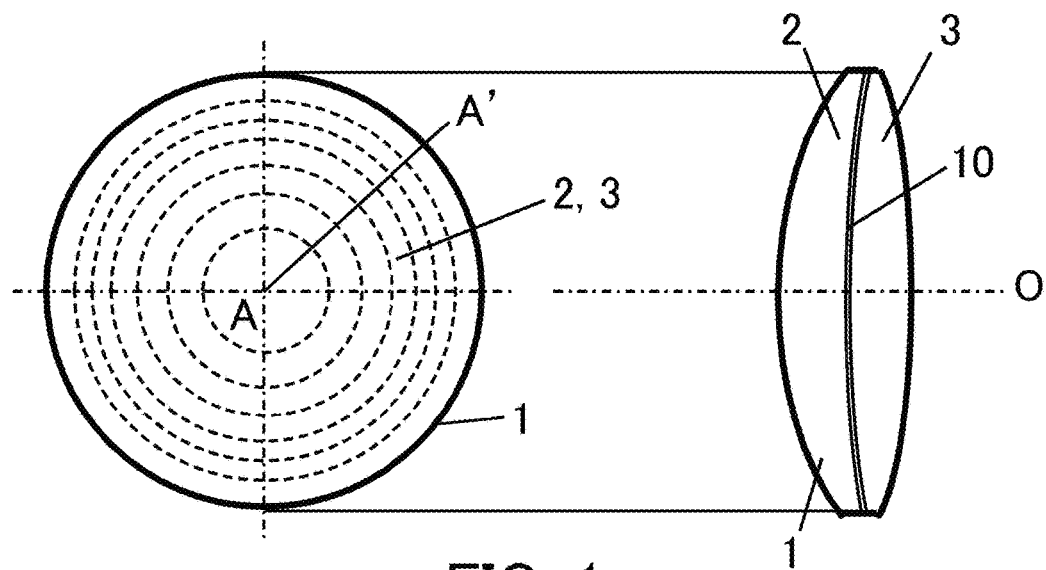
FIG. 1 is a schematic diagram of a diffractive optical element in each embodiment.

First, a diffractive optical element in this embodiment will be described. FIG. 1 is a schematic diagram (front view and side view) of a diffractive optical element 1 (DOE) in this embodiment. The diffractive optical element 1 is configured to increase a diffraction efficiency of diffracted light having a specific order (designed order) in a use wavelength band of an entire visible wavelength band. The diffractive optical element 1 includes a pair of transparent substrate lenses 2 and 3 and a diffraction grating portion 10 disposed between the substrate lenses 2 and 3. Each of the substrate lenses 2 and 3 has a shape of flat plate or a shape for achieving a lens effect. In this embodiment, both surfaces of each of the substrate lenses 2 and 3 are curved surfaces. The diffraction grating portion 10 has a concentric shape of a diffraction grating centered around an optical axis O, and it has a lens effect.

Figure 2:
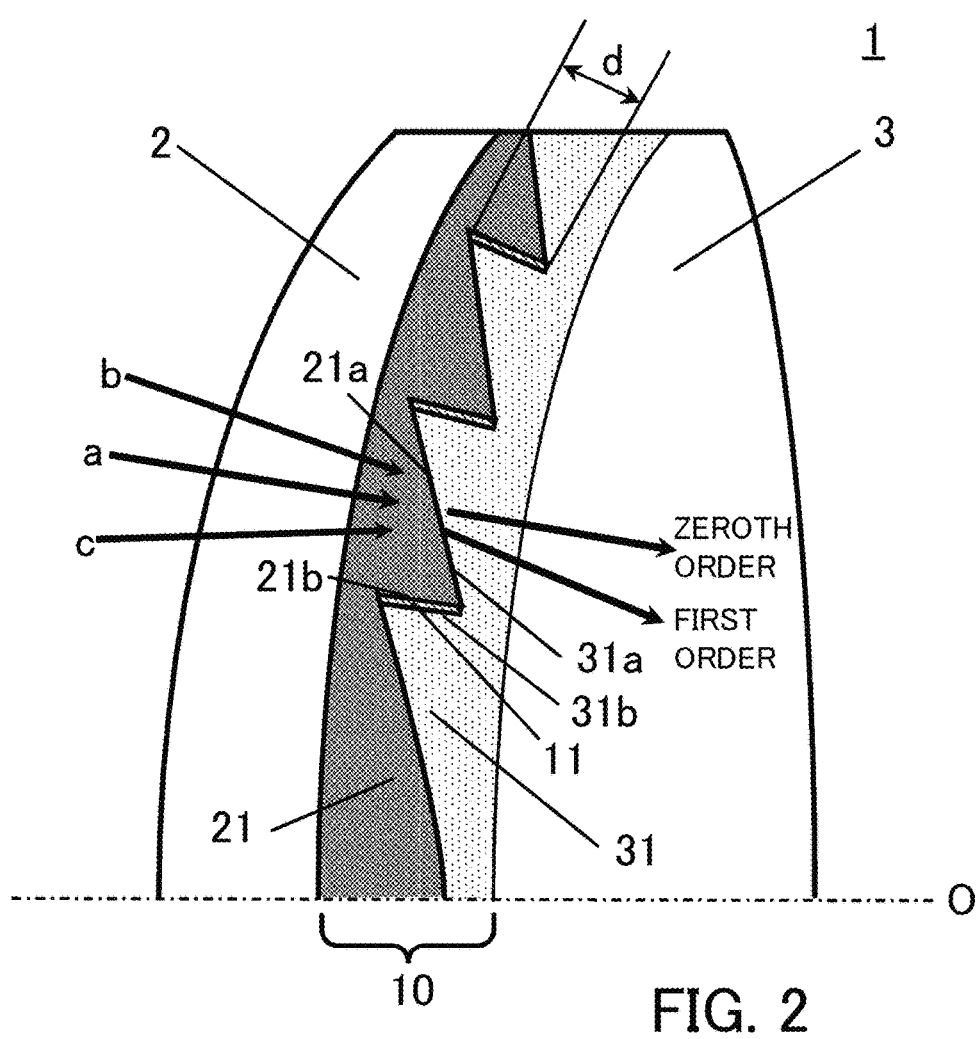
FIG. 2 is an enlarged cross-sectional view of the diffractive optical element in each embodiment.
Figure 3:
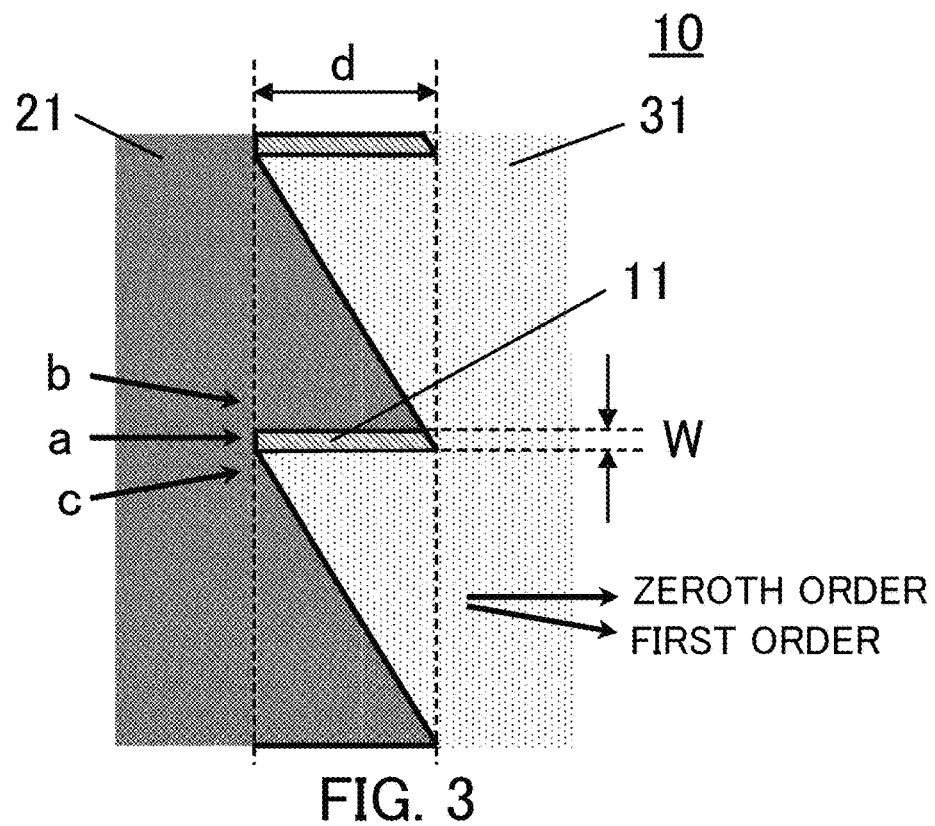
FIG. 3 is an enlarged cross-sectional view of a diffractive optical portion in each embodiment.

FIG. 2 is an enlarged cross-sectional view of the diffractive optical element 1 which is cut along a line A-A' illustrated in FIG. 1. For describing the grating shape easily, FIG. 2 is deformed in a grating depth direction. The gratings are depicted such that the number of the gratings is smaller than that in reality. The same is true on cross-sectional views described below. FIG. 3 is an enlarged cross-sectional view of the diffraction grating portion 10 illustrated in FIG. 2. In FIGS. 2 and 3, an incident light beam "a" is a light beam that is incident at an incident angle of 0 degree as a designed incident angle of the diffractive optical element 1. An incident light beam "b" is a light beam that is incident downward at an obliquely incident angle (off-screen light incident angle). An incident light beam "c" is a light beam that is incident upward at an obliquely incident angle (off-screen light incident angle).

As illustrated in FIGS. 2 and 3, the diffraction grating portion 10 includes a diffraction grating 21 (first diffraction grating), a diffraction grating 31 (second diffraction grating), and a thin film 11. The diffraction gratings 21 and 31 are formed by being firmly attached to each other in an optical axis direction (direction along the optical axis O). The thin film 11 is provided between a grating wall surface 21b (first grating wall surface) of the diffraction grating 21 and a grating wall surface 31b (second grating wall surface) of the diffraction grating 31, and it is in contact with both the grating wall surfaces 21b and 31b.

The thin film 11 is transparent with respect to light having a wavelength λ (arbitrary wavelength) in a use wavelength band (for example, a visible wavelength band). Specifically, when an extinction coefficient of the thin film 11 for light (having a wavelength λ) in a use wavelength band is less than or equal to 0.0005, the thin film 11 is substantially transparent. If the extinction coefficient of the thin film 11 exceeds 0.0005, the thin film 11 have absorption characteristics. Furthermore, when the light is obliquely incident on the diffractive optical element, reflected light occurs on the interface between each diffraction grating and the thin film 11 due to a difference between an extinction coefficient of each diffraction grating and the extinction coefficient of the thin film 11. Accordingly, it is preferred that the extinction coefficient of the thin film 11 is not greater than 0.0005. More preferably, the extinction coefficient of the thin film 11 with respect to the light in the use wavelength band is not greater than 0.0003.

The diffraction grating 21 may be integrated with (i.e., formed by the same material as that of) the substrate lens 2, or alternatively it may be separated (i.e., formed by a different material) from the substrate lens 2. Similarly, the diffraction grating 31 may be integrated with (i.e., formed by the same material as that of) the substrate lens 3, or alternatively it may be separated (i.e., formed by a different material) from the substrate lens 3. In this embodiment, while the diffraction gratings 21 and 31 are attached firmly to each other in the optical axis direction, the thin film 11 disposed between the diffraction gratings 21 and 31 may be provided over an entire region of a boundary surface of both of the diffraction gratings 21 and 31 as described below. Thus, the diffraction gratings 21 and 31 may be laminated in the optical axis direction.

The diffraction grating 21 has a concentric blazed structure including a grating surface 21a (first grating surface) and the grating wall surface 21b (first grating wall surface). Similarly, the diffraction grating 31 has a concentric blazed structure including a grating surface 31a (second grating surface) and the grating wall surface 31b (second grating wall surface). Each of the diffraction gratings 21 and 31 gradually changes a grating pitch with increasing a distance from the optical axis O (i.e., with approaching an outer periphery) to achieve a lens effect (light converging effect and light diverging effect). The grating surfaces 21a and 31a are firmly in contact with each other, and the diffraction gratings 21 and 31, as a whole, function as a single diffraction grating portion 10. Each of the diffraction gratings 21 and 31 has a blazed structure, and accordingly incident light that enters the diffractive optical element 1 is concentrated and diffracted in a direction of a specific diffraction order (+1st order in FIGS. 2 and 3) with respect to 0th order diffraction direction in which incident light transmits through the diffraction grating portion 10 without being diffracted.

The use wavelength band of the diffractive optical element 1 in this embodiment is a visible band. Therefore, according to a scalar diffraction theory, materials and grating heights of the diffraction gratings 21 and 31 are selected according to a scalar diffraction theory so as to improve the diffraction efficiency of the diffracted light having a designed order in an entire visible band. In other words, the material and the grating height of each diffraction grating are determined such that a maximum optical path difference (maximum value of an optical path difference between a peak and a valley of a diffraction portion) of light passing through the plurality of diffraction gratings (diffraction gratings 21 and 31) is near an integral multiple of a wavelength in the use wavelength band. As described above, by setting the material and the shape of each of the diffraction gratings 21 and 31 appropriately, a high diffraction efficiency can be obtained in an entire use wavelength band.

Typically, the grating height of the diffraction grating is defined as a height from a grating groove to a grating end in a direction (surface normal direction) that is perpendicular to a grating periodic direction. If the grating wall surface is shifted from the surface normal direction or the grating end is deformed, the grating height is defined as a distance from an intersection of an extended line of the grating surface and the surface normal. In this embodiment, the material and the grating height of the diffraction grating are not limited thereto.

In this embodiment, the diffraction gratings 21 and 23 are formed by materials different from each other. For example, the diffraction grating 31 is constituted by a low refractive index dispersion material, and the diffraction grating 21 is constituted by a high refractive index dispersion material having a refractive index higher than that of the diffraction grating 31. In this embodiment, a high diffraction efficiency can be obtained by satisfying the following expressions (1) to (3).

$$vd2 > 35 \quad (1)$$

$$vd3 < 25 \quad (2)$$

$$0.960 \leq (n_2 - n_3) \times d/(m \times \lambda) \leq 1.040 \quad (3)$$

In expressions (1) to (3), $n_2$ and $n_3$ are refractive indices of the materials constituting the diffraction gratings 21 and 23 for the wavelength λ, respectively, and vd2 and vd3 are Abbe numbers of the diffraction gratings 21 and 23, respectively. In expression (3), d is a grating height of each of the diffraction gratings 21 and 23, and m is a designed order. The visible wavelength band in this embodiment is mainly a wavelength band from 400 nm to 700 nm.

In order to obtain a high diffraction efficiency in an entire visible wavelength band, it is preferred that the Abbe number of the high-refractive index and low-dispersion material (diffraction grating 21) is set to be larger than 35, and the Abbe number of the low-refractive index and high-dispersion material (diffraction grating 31) is set to be smaller than 25. More preferably, a material having a partial dispersion ratio θgF that is smaller than that of a typical material (i.e., material having a linear anomalous dispersion) is used. In order to obtain this linear anomalous dispersion, a method of dispersing ITO fine particles to be mixed into abase resin material can be used. Differently from other inorganic oxides, the ITO changes its refractive index due to free carriers caused by doping by tin or holes of oxygen, in addition to a change of the refractive index caused by electron transition. Extremely-strong linear dispersion characteristics are indicated by influences of the electron transition and the free carriers. Accordingly, $SnO_2$ and ATO ($SnO_2$ with doping of antimony), as well as ITO that is influenced by the free carriers can be also used.

A resin material in which fine particles are dispersed is an ultraviolet curable resin, and it includes any of acrylic, fluorine, vinyl, or epoxy organic resins, but it is not limited thereto. It is preferred that an averaged particle diameter of the fine particle material is not greater than ¼ of the wavelength (use wavelength or designed wavelength) of the incident light on the diffractive optical element 1. If the particle diameter is larger than the wavelength of the incident light, there is a possibility that Rayleigh scattering increases when the fine particle material is mixed with the resin material. It is preferred that the grating height d is set to be not higher than 15 μm. According to this configuration, the decrease of the diffraction efficiency can be suppressed when obliquely incident light is incident.

The thin film 11 has an approximately uniform thickness along the grating wall surface, and it is disposed on at least a part of the boundary of the diffraction gratings 21 and 31. In this embodiment, the thin film 11 is provided on the grating wall surfaces 21b and 31b. By providing the thin film 11, a light beam incident near the grating wall surface is confined inside the thin film 11, and thus an optical waveguide is formed.

In the diffractive optical element 1 of this embodiment, with respect to the wavelength λ in the use wavelength band, refractive indices of the materials of the thin film 11, the diffraction grating 21, and the diffraction grating 31 are denoted by $n_1$, $n_2$, and $n_3$, respectively. A relative refractive index difference of the thin film 11 and the diffraction grating 21 is denoted by Δ. In this case, by satisfying the following expressions (4) and (5), the diffraction efficiency of the designed order of the light beam incident at the designed incident angle can be improved and the diffraction efficiency of ±1st order as designed orders can be reduced, and unnecessary light which reaches an imaging plane of unnecessary light caused by light beams incident at an obliquely incident angle can be reduced. Furthermore, by satisfying expressions (4) and (5), a wavelength dependence and a polarization dependence in the diffractive optical element 1 are reduced, and accordingly it is possible to have desired wavelength characteristics and polarization characteristics.

$$n1 > n2 > n3 \quad (4)$$

$$0.005 < \Delta < 0.045 \quad (5)$$

In expression (5), the relative refractive index difference Δ is obtained by the following expression (6).

$$\Delta = \frac{n_1^2 - n_2^2}{2n_1^2} \quad (6)$$

It is preferred that expression (5) satisfies the following expression (5a).

$$0.007 < \Delta < 0.042 \quad (5a)$$

By satisfying the lower limit of expression (5) or expression (5a), the unnecessary light which reaches the imaging plane in the unnecessary light caused by the light beams incident at the obliquely incident angle can be reduced. By satisfying the upper limit of expression (5) or expression (5a), the polarization dependence can be reduced.

The materials of constituting the thin film 11 and the diffraction gratings 21 and 31 are asymmetric three-layer flat plate waveguides, and accordingly it is known that the following eigenvalue equations are satisfied. Expressions (7) and (8) relate to TE polarization (TE polarized light) and TM polarization (TM polarized light), respectively.

$$\tan(\kappa_{TE} W) = \frac{\kappa_{TE}(\gamma_{TE} + \delta_{TE})}{(\kappa_{TE}^2 - \gamma_{TE}\delta_{TE})} \quad (7)$$

$$\kappa_{TE} = \sqrt{k_0^2 n_1^2 - \beta_{TE}^2}$$

$$\gamma_{TE} = \sqrt{\beta_{TE}^2 - k_0^2 n_2^2}$$

$$\delta_{TE} = \sqrt{\beta_{TE}^2 - k_0^2 n_3^2}$$

$$\tan(\kappa_{TM} W) = \frac{n_1^2 \kappa_{TM}(n_3^2 \gamma_{TM} + n_2^2 \delta_{TM})}{(n_2^2 n_3^2 \kappa_{TM}^2 - n_1^4 \gamma_{TM}\delta_{TM})} \quad (8)$$

$$\kappa_{TM} = \sqrt{k_0^2 n_1^2 - \beta_{TM}^2}$$

$$\gamma_{TM} = \sqrt{\beta_{TM}^2 - k_0^2 n_2^2}$$

$$\delta_{TM} = \sqrt{\beta_{TM}^2 - k_0^2 n_3^2}$$

In expressions (7) and (8), $k_0$ is a value that is defined as expression (9) below.

$$k_0 = 2\pi/\lambda \quad (9)$$

With respect to a cutoff width where a single mode of the asymmetric three-layer flat plate waveguide, a cutoff width $W_{C,TE}$ of the TE polarization (TE polarized light) and a cutoff width $W_{C,TM}$ of the TM polarization (TM polarized light) are represented by the following expressions (10) and (11), respectively.

$$W_{C,TE} = \frac{1}{\kappa_C} \tan^{-1}\left(\frac{\delta_C}{\kappa_C}\right) \quad (10)$$

$$W_{C,TM} = \frac{1}{\kappa_C} \tan^{-1}\left(\frac{n_1^2 \delta_C}{n_3^2 \kappa_C}\right) \quad (11)$$

In expressions (10) and (11), $\kappa_c$ and $\delta_c$ are values that are defined by expression (12) below.

$$\kappa_C = k_0\sqrt{n_1^2 - n_2^2}$$

$$\delta_C = k_0\sqrt{n_2^2 - n_3^2} \quad (12)$$

In this embodiment, when a width W (film width) of the thin film 11 and an average Wc of the cutoff widths represented by expression (14) where the single modes of the TE polarization (TE polarized light) and the TM polarization (TM polarized light) occurs satisfy the following expression (13), the diffractive optical element 1 can achieve a desired effect. In other words, the diffractive optical element 1 can improve the diffraction efficiency of the designed order of the light beam incident at the designed incident angle and reduce the diffraction efficiency of ±1st order as designed orders, and accordingly it can reduce unnecessary light reaching an imaging plane of unnecessary light caused by light beams incident at an obliquely incident angle. Furthermore, the diffractive optical element 1 reduces the wavelength dependence and the polarization dependence, and accordingly it is possible to have desired wavelength characteristics and polarization characteristics. The width W of the thin film 11 is a width of the thin film 11 between the grating wall surfaces 21b and 31b (i.e., distance between the grating wall surfaces 21b and 31b).

$$0.5 \leq W/Wc \leq 2.0 \quad (13)$$

$$W_C = \frac{W_{C,TE} + W_{C,TM}}{2} \quad (14)$$

In this embodiment, it is preferred that expression (13) satisfy expression (13a) below.

$$0.75 \leq W/W_C \leq 1.75 \quad (13a)$$

With respect to the cutoff width where a 1st order mode occurs as a single mode condition of the asymmetric three-layer flat plate waveguide, a cutoff width $W_{TE0}$ of the TE polarization and a cutoff width $W_{TM0}$ of the TM polarization are represented by the following expressions (15) and (16), respectively.

$$W_{TE0} = \frac{\tan^{-1}\sqrt{a'} + \pi}{k_0 n_1 \sqrt{2\Delta}} \quad (15)$$

$$W_{TM0} = \frac{\tan^{-1}\{(n_1/n_2)^2 \sqrt{a'}\} + \pi}{k_0 n_1 \sqrt{2\Delta}} \quad (16)$$

In expressions (15) and (16), a' is a value that is defined by expression (17) below.

$$a' = \frac{n_2^2 - n_3^2}{n_1^2 - n_2^2} \quad (17)$$

With respect to an equivalent refractive index as a refractive index that is worked by a waveguide mode, an equivalent refractive index $n_{eq,TE}$ of the TE polarization and an equivalent refractive index $n_{eq,TM}$ of the TM polarization are represented by the following expressions (18) and (19), respectively.

$$n_{eq,TE} = \beta_{TE}/k_0 \quad (18)$$

$$n_{eq,TM} = \beta_{TM}/k_0 \quad (19)$$

In expressions (18) and (19), $\beta_{TE}$ and $\beta_{TM}$ are propagation constants for the TE polarization and the TM polarization, respectively.

If a waveguide width of the asymmetric three-layer flat plate waveguide is less than a cutoff width of the single mode in expression (10) for the TE polarization and in expression (11) for the TM polarization, a radiation mode occurs and accordingly there is no solution in expressions (7) and (8). On the other hand, if the waveguide width is more than the cutoff width of the single mode, a waveguide mode occurs and accordingly there is a solution in each of expressions (7) and (8). If the waveguide width is less than the cutoff width of a 1st order mode in expression (15) for the TE polarization and in expression (16) for the TM polarization, a single mode condition is applied and accordingly it is known that each of expressions (7) and (8) only has a solution. In this condition, an equivalent refractive index in each of expressions (18) and (19) can be obtained for each of the TE polarization and the TM polarization. This condition is met when the width W (film thickness) of the thin film 11 satisfies expression (20) below.

$$W < \frac{W_{TE0} + W_{TM0}}{2} \quad (20)$$

More strictly, $W_{TE0} < W_{TM0}$ is always satisfied, and accordingly it is necessary to satisfy expression (21) below in order to have a solution for each of the TE polarization and the TM polarization.

$$W < W_{TE0} \quad (21)$$

An average of the equivalent refractive indices (equivalent refractive index $n_{eq}$ of propagation light that is propagated inside the thin film 11) of the TE polarization and the TM polarization in expressions (18) and (19) that is worked by the waveguide mode of the asymmetric three-layer flat plate waveguide is represented by expression (23) below. In this embodiment, a phase difference between the equivalent refractive index $n_{eq}$ and a refractive index $n_2$ of the diffraction grating 21 as a high refractive index material is small so as to satisfy expression (22) below.

$$0 \le (n_{eq} - n_2) \times d/\lambda < 0.3 \quad (22)$$

$$n_{eq} = \frac{n_{eq,TE} + n_{eq,TM}}{2} \quad (23)$$

As a result, light which is to be unnecessary light if the thin film 11 is not provided can be confined in the optical waveguide and the phase matching of the waveguide mode and the diffraction grating can be achieved, and accordingly it is possible to improve the diffraction efficiency of the designed order. In addition to the improvement of the diffraction efficiency of the designed order, the diffraction efficiency of the ±1st order as a designed order can be reduced and unnecessary light reaching the imaging plane of unnecessary light caused by light beams incident at an obliquely incident angle (off-screen light incident angle) can be reduced.

In this embodiment, it is preferred that expression (22) satisfies expression (22a) below.

$$0 \le (n_{eq} - n_2) \times d/\lambda < 0.2 \quad (22a)$$

While a phase matching condition is met even when a phase difference of expression (22) is N×λ (N is an integer not less than 1), a wavelength dependence is large in this condition and it is difficult to satisfy the condition over an entire visible wavelength band, and accordingly it is not preferable. In this embodiment, the relative refractive index difference Δ is smaller at a short wavelength side than at a long wavelength side in the use wavelength band (i.e., a relative refractive index difference with respect to a first wavelength (λ1) in the use wavelength band is smaller than a relative refractive index difference with respect to a second wavelength (λ2>λ1) longer than the first wavelength). Accordingly, the wavelength dependence can be effectively reduced. Furthermore, the wavelength dependence can be reduced by the relative refractive index difference Δ and the wavelength λ as the use wavelength satisfying expression (24) below.

$$0.01 < \Delta/\lambda < 0.08 \quad (24)$$

In this embodiment, the wavelength dependence can be reduced by increasing the Abbe number of the material of the thin film 11 compared with the Abbe number of the material of the diffraction grating 31 (second diffraction grating).

By setting the material and the film width W of the thin film 11 that satisfy the relationship described above appropriately, the effect of this embodiment can be obtained.

It is preferred that the refractive index $n_1$ of the thin film 11 satisfies expression (25) below.

$$1.64 < n_1 < 1.75 \quad (25)$$

By satisfying expression (25), as described in each of Embodiments 1 to 6 below, the thin film used for the diffractive optical element which reduces the wavelength dependence and the polarization dependence can be provided and the selectivity of the material of the diffraction grating can be broadened. If the lower limit of expression (25) is not satisfied, both of the refractive indices of the thin film and the diffraction grating are decreased. In this case, the selectivity of the material of the thin film is limited, or the cost of the material of the thin film is increased. Furthermore, the selectivity of the material for obtaining the diffraction grating having a high refractive index over an entire visible wavelength band in accordance with the thin film is narrowed.

If the upper limit of expression (25) is not satisfied, it is difficult to reduce the wavelength characteristics. Furthermore, both of the refractive indices of the thin film and the diffraction grating are increased. In this case, the selectivity of the material for obtaining the diffraction grating with a high refractive index over the entire visible wavelength band is narrowed. It is preferred that expression (26) below is satisfied.

$$1.65 < n_1 < 1.70 \quad (26)$$

The material of the thin film 11 is not limited to a specific material. As the material of the thin film 11, for example, an oxide such as $Al_2O_3$, $ZrO_2$, $La_2O_3$, $Y_2O_3$, $HfO_2$, $Ta_2O_5$, $Nb_2O_5$, $TiO_2$, and $SiO_2$, a fluoride such as $LaF_3$, $NdF_3$, $CeF_3$, and $MgF_2$, a compound such as ZnS, CdS, ZnSe, and ZnTe, a mixture or a compound of the materials described above can be adopted. As the material of the thin film 11, an organic resin such as acrylic, fluorine, vinyl, and epoxy resins, or a material which contains the organic resin in which fine particles are dispersed may be adopted.

Similarly, a method of manufacturing the thin film 11 is not limited to a specific method. For example, it is possible to manufacture the diffraction grating 31 and then form the thin film 11 selectively. Specifically, the material of the thin film 11 can be formed in a thin-film shape by using a physical vapor deposition such as a vacuum vapor deposition or a spin coat method, and then patterning is performed by using a lithography method or a nanoimprint method and an etching method is used to form the thin film 11 selectively. Alternatively, a method of forming the thin film 11 selectively by a vapor deposition using a mask pattern can be used. The thin film 11 may be provided over an entire region of the boundary of both sides as described below. In this case, it is not necessary to form the thin film 11 selectively only on a grating wall surface portion. Then, the diffraction grating 21 is formed, and thus the diffractive optical element 1 can be manufactured. The width or the shape of the thin film 11 may be changed (controlled) for each annular zone of the diffractive optical element 1.

Figure 28:
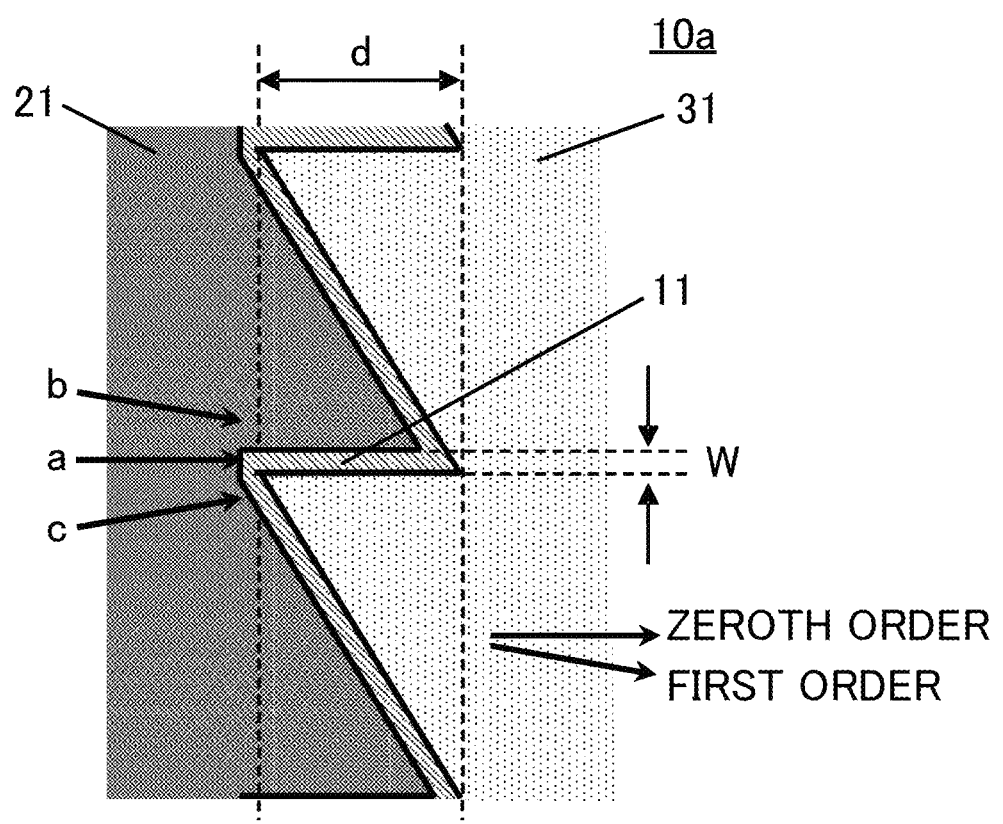
FIG. 28 is an enlarged cross-sectional view of a diffractive optical portion as a modification in each embodiment.

FIG. 28 is an enlarged cross-sectional view of a diffractive optical portion 10a as a modification of this embodiment. As illustrated in FIG. 28, the thin film 11 may be provided on an entire region of the boundary of the diffraction gratings 21 and 31, in addition to the grating wall surface. In other words, the thin film 11 is provided continuously from a region between the diffraction wall surfaces 21b and 31b to a region between the grating surfaces 21a and 31a. In this case, a grating wall surface portion may satisfy the relationship described above and a grating surface portion may have an antireflection function. The refractive index and the film width of the thin film on the grating surface may be different from those of the grating wall surface. Since the thin film is formed on the entire region of the boundary, the diffractive optical element can be easily manufactured at low cost. For example, after the diffraction grating 21 is manufactured, the thin film is formed on the entire region from the grating surface to the grating wall surface by a physical vapor deposition such as a vacuum vapor deposition or a spin coat method, and then the diffraction grating 31 may be formed. However, this embodiment is not limited thereto. Furthermore, by providing the thin film on an entire region of the boundary, the adhesion of the diffraction gratings 21 and 31 each other can be improved. Since the refractive index and the film thickness of the grating surface and the grating wall surface may be different, an antireflection function of the grating surface and a flare reduction function of the grating wall surface can be arbitrarily designed according to a manufacturing method.

In this embodiment, a case in which a refractive index $n_3$ of the material of the diffraction grating 31 is smaller than a refractive index $n_2$ of the material of the diffraction grating 21 ($n_2 > n_3$) is described as an example. However, this embodiment is not limited thereto. When $n_3 > n_2$ is satisfied, only the direction of the grating shape of the diffraction grating is opposite, and accordingly the influence of unnecessary light caused by the grating wall surface is similar.

Figure 4:
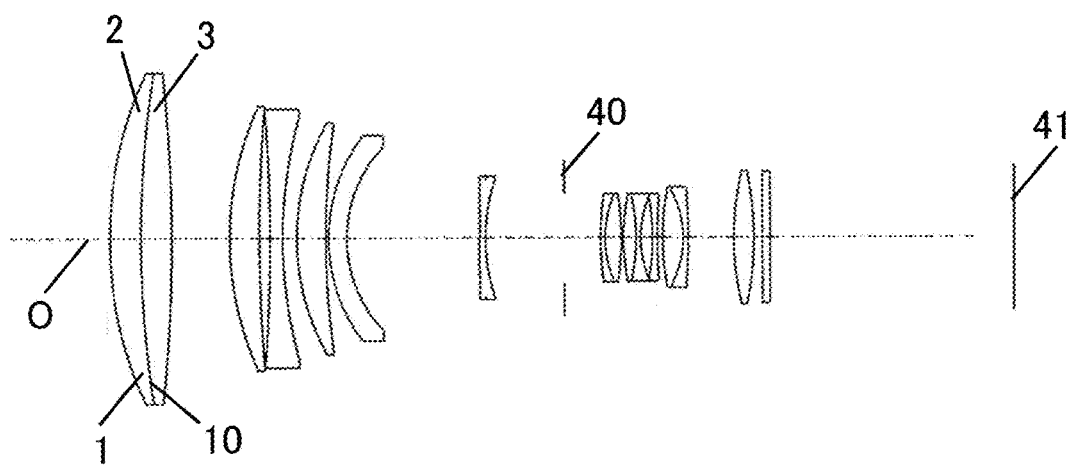
FIG. 4 is a schematic diagram of an optical system including the diffractive optical element in each embodiment.

FIG. 4 is a schematic diagram of an optical system including the diffractive optical element 1 in this embodiment. The optical system illustrated in FIG. 4 is a telephoto-type image pickup optical system including the diffractive optical element 1, which is applicable to an image pickup apparatus such as a camera, and a diffraction surface is provided on a second surface. The optical system illustrated in FIG. 4 includes an aperture stop 40 and the diffractive optical element 1 in its inside. The aperture stop 40 is disposed at an emission side opposite to an incident side at which light is incident on the diffractive optical element 1, i.e., it is disposed at a rear side (image plane side) relative to the diffractive optical element 1. Reference numeral 41 denotes a photoelectric conversion element (image pickup element or image sensor) such as a CCD or CMOS or a film as an imaging plane.

By applying the diffractive optical element 1 of this embodiment to such an optical system, unnecessary light of photographing light is reduced and unnecessary light reaching the imaging plane when light beams are incident from an outside of a screen is reduced, and accordingly an imaging lens with little flare can be obtained. In FIG. 4, the diffractive optical element 1 is provided on a bonding surface of front lenses, but this embodiment is not limited thereto. The diffractive optical element 1 may be disposed inside the optical system, or alternatively it may be provided on a lens surface. A plurality of diffractive optical elements 1 may be provided in an imaging lens. The optical system to which the diffractive optical element 1 can be applied is not limited to the image pickup optical system illustrated in FIG. 4. The optical system of this embodiment can be applied also to an imaging lens of a video camera, an imaging optical system which is used with a wide wavelength band such as an image scanner and a reader lens of a copying machine, an observation optical system such as binoculars and a telescope, or an optical finder. An apparatus to which the optical system including the diffractive optical element 1 can be applied is not limited to an image pickup apparatus, and it can be widely applied also to an optical apparatus. Hereinafter, specific examples of the diffractive optical element 1 in this embodiment will be described in Embodiments 1 to 6.

Embodiment 1

First, a diffractive optical element in Embodiment 1 of the present invention will be described. In this embodiment, the diffraction grating 21 is constituted by an Acrylic ultraviolet curable resin which is mixed with $ZrO_2$ fine particles, and the diffraction grating 31 is constituted by an Acrylic ultraviolet curable resin which is mixed with ITO fine particles. The grating height d is 10.79 μm, and the designed order is +1st order. The thin film 11 is constituted by a thin film of $Al_2O_3$, and a thickness or a width W of the thin film 11 in a direction perpendicular to the grating wall surface as a lamination plane is 360 nm. An extinction coefficient of the thin film 11 in a wavelength band from 400 nm to 700 nm is not greater than 0.0003. Specifically, the extinction coefficient of the thin film 11 is maximized with respect to light having the wavelength of 400 nm, and the extinction coefficient for the wavelength of 400 nm is 0.0002.

Table 1 indicates parameters of the diffractive optical element and numerical values of respective expressions for each wavelength λ (nm) in this embodiment. Symbols $n_1$, $n_2$, and $n_3$ are refractive indices of the materials of the thin film 11, the diffraction grating 21, and the diffraction grating 31 for each wavelength λ, respectively. Symbol d (μm) is a grating height, symbol W (nm) is a film width of the thin film 11, symbol Δ is a relative refractive index difference represented by expression (6), and symbol a' is a value represented by expression (17). Symbols $W_{C,TE}$ (nm) and $W_{C,TE}$ (nm) are cutoff widths of the TE polarization and the TM polarization represented by expressions (10) and (11), respectively. Symbol $W_C$ (nm) is an average of the cutoff widths of the TE polarization and the TM polarization represented by expression (14). Symbol $W/W_C$ is a value represented by expression (13). Symbols $n_{eq,TE}$ and $n_{eq,TM}$ are equivalent refractive indices of the TE polarization and the TM polarization represented by expressions (18) and (19), respectively. Symbol $n_{eq}$ is an equivalent refractive index as an average of the equivalent refractive indices of the TE polarization and the TM polarization represented by expression (23). Symbol $(n_{eq}-n_2)d/\lambda$ is a phase difference between the averaged equivalent refractive index $n_{eq}$ and the refractive index $n_2$ of the high-refractive index material of the diffraction grating 21, which is represented by expression (22).

Incident angles of the imaging light beam A with respect to the m grating and the imaging light beam A' with respect to the m' grating are in a direction of a center of gravity of a ray. Directions of the grating wall surfaces 1b and 1b' are equal to the direction of the center of gravity of the ray.

Figure 6:
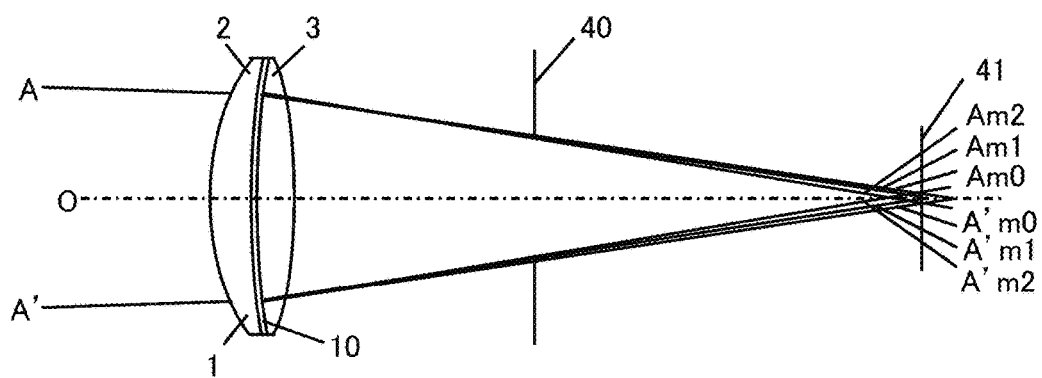
FIG. 6 is an explanatory diagram of an influence by unnecessary light at a designed incident angle (imaging light incident angle) relating to the optical system of FIG. 4.

In FIG. 6, symbols Am1, Am0, and Am2 indicate +1st order diffracted light, 0th order diffracted light, and +2nd order diffracted light of the imaging light beams A that are emitted from the m grating, and symbols A'm1, A'm0, and A'm2 indicate +1st order diffracted light, 0th order diffracted light, and +2nd order diffracted light of the imaging light beams A' that are emitted from the m' grating. The +1st order diffracted lights Am1 and Am'1 as designed orders are imaged on the imaging plane 41. On the other hand, the 0th order diffracted lights Am0 and Am'0 as the designed order of −1st order are imaged on an image side relative to the imaging plane 41. The +2nd order diffracted lights Am2 and Am'2 as the designed order of +1st order are imaged on an object side relative to the imaging plane 41. Since a spot size on the imaging plane is blurred with increasing a difference from the designed order, unnecessary light is inconspicuous. In other words, with respect to the unnecessary light at a designed incident angle (imaging light incident angle), the diffraction efficiency of the ±1st order diffracted light as designed orders has the greatest impact.

Figure 7A:
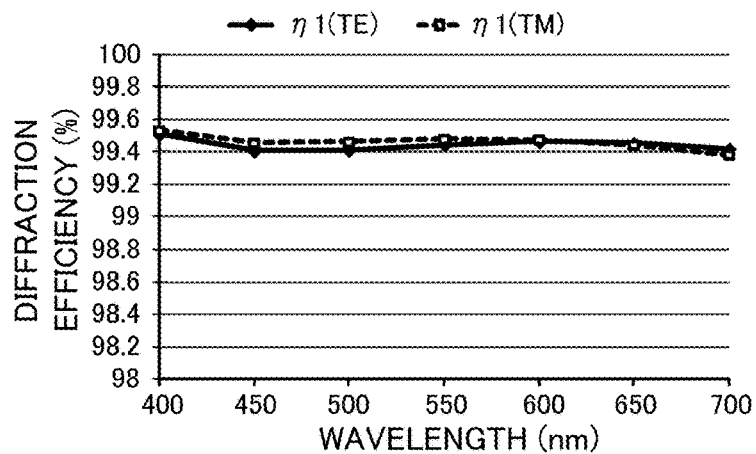
FIGS. 7A to 7C are graphs of diffraction efficiencies of +1st order diffracted light, 0th order diffracted light, and +2nd order diffracted light, respectively, for a light beam at a designed incident angle in the diffractive optical element of Embodiment 1.
Figure 7B:
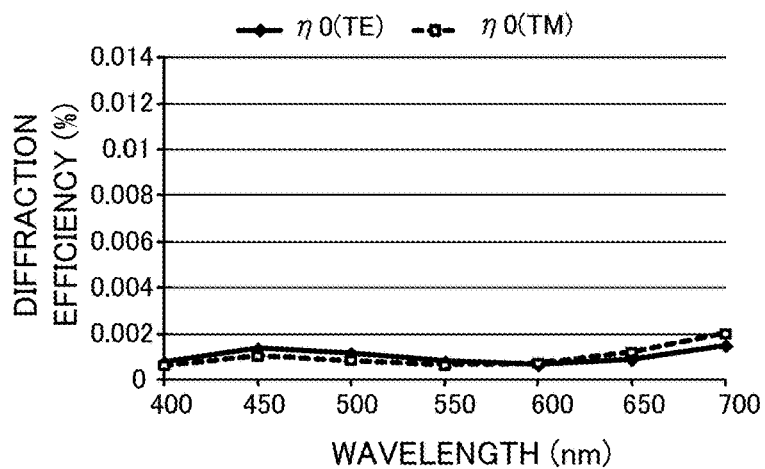
Figure 7C:
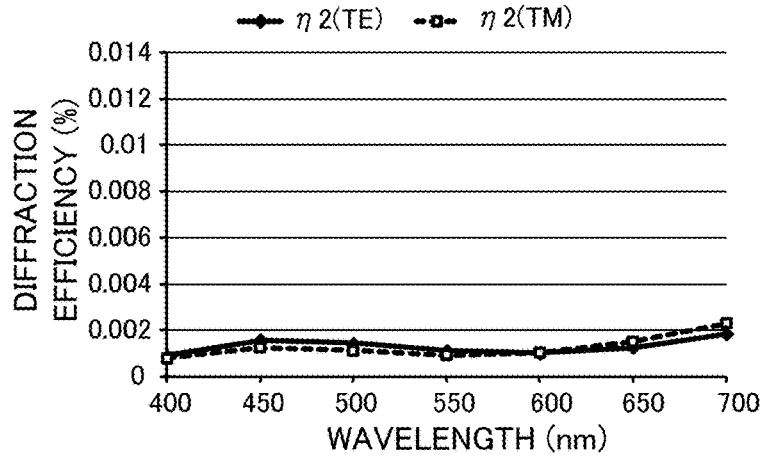

FIGS. 7A to 7C are graphs of diffraction efficiencies of the +1st order diffracted light, the 0th order diffracted light, and the +2nd order diffracted light, respectively, for a light beam at a designed incident angle in the diffractive optical element of Embodiment 1. In other words, assuming the incident light beam "a" as a designed incident angle (imaging light incident angle) illustrated in FIG. 3 and the incident light beam A of FIGS. 5 and 6, FIGS. 7A to 7C illustrate an RCWA calculation result at an incident angle of 0 degree with a grating pitch of 100 μm. FIGS. 7A to 7C illustrate the

TABLE 1

| | λ | | | | | | |
|---|---|---|---|---|---|---|---|
| | 400 | 450 | 500 | 550 | 600 | 650 | 700 |
| $n_1$ | 1.66330 | 1.65760 | 1.65350 | 1.65050 | 1.64820 | 1.64630 | 1.64480 |
| $n_2$ | 1.64626 | 1.63549 | 1.62822 | 1.62298 | 1.61903 | 1.61596 | 1.61352 |
| $n_3$ | 1.60919 | 1.59379 | 1.58189 | 1.57201 | 1.56343 | 1.55573 | 1.54865 |
| d (μm) | 10.79 | 10.79 | 10.79 | 10.79 | 10.79 | 10.79 | 10.79 |
| W (nm) | 360 | 360 | 360 | 360 | 360 | 360 | 360 |
| Δ | 0.0102 | 0.0132 | 0.0152 | 0.0165 | 0.0175 | 0.0183 | 0.0188 |
| Δ/λ | 0.0255 | 0.0294 | 0.0303 | 0.0301 | 0.0292 | 0.0281 | 0.0269 |
| a' | 2.1399 | 1.8496 | 1.7929 | 1.8076 | 1.8568 | 1.9303 | 2.0125 |
| $W_{c,TE}$ (nm) | 260 | 249 | 257 | 272 | 290 | 311 | 334 |
| $W_{c,TM}$ (nm) | 269 | 258 | 268 | 285 | 305 | 329 | 353 |
| $W_c$ (nm) | 264 | 254 | 263 | 278 | 298 | 320 | 344 |
| $W/W_c$ | 1.36 | 1.42 | 1.37 | 1.29 | 1.21 | 1.12 | 1.05 |
| $n_{eq,TE}$ | 1.64765 | 1.63764 | 1.63029 | 1.62461 | 1.62010 | 1.61649 | 1.61368 |
| $n_{eq,TM}$ | 1.64744 | 1.63730 | 1.62987 | 1.62417 | 1.61969 | 1.61619 | 1.61353 |
| $n_{eq}$ | 1.64754 | 1.63747 | 1.63008 | 1.62439 | 1.61989 | 1.61634 | 1.61360 |
| $(n_{eq}-n_2)d/\lambda$ | 0.0346 | 0.0475 | 0.0401 | 0.0276 | 0.0155 | 0.0063 | 0.0013 |

Figure 5:
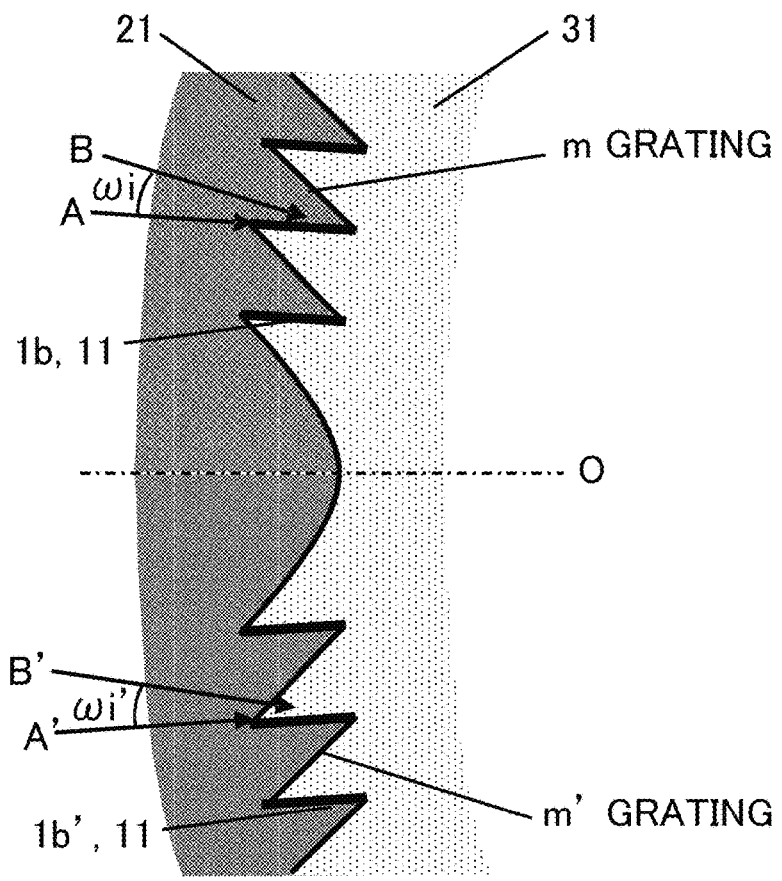
FIG. 5 is an enlarged cross-sectional view of a diffractive optical portion in Embodiment 1.

FIG. 5 is an enlarged cross-sectional view of a diffractive optical portion in this embodiment. FIG. 6 is an explanatory diagram of an influence by unnecessary light at a designed incident angle (imaging light incident angle) relating to the optical system of FIG. 4. In FIGS. 5 and 6, imaging light beams A and A' that are incident with respect to the optical axis O pass through the substrate lens 2, and then they are incident on an m grating as an m-th diffraction grating counting from the optical axis O in an upward direction and an m' grating as an m-th diffraction grating counting from the optical axis O in an downward direction, respectively.

diffraction efficiencies of the TE polarization and the TM polarization for the +1st order diffracted light as the designed order, the 0th order diffracted light, and the +2nd order diffracted light, respectively. A direction of a diffraction angle is positive in a downward direction of FIG. 3.

Figure 8A:
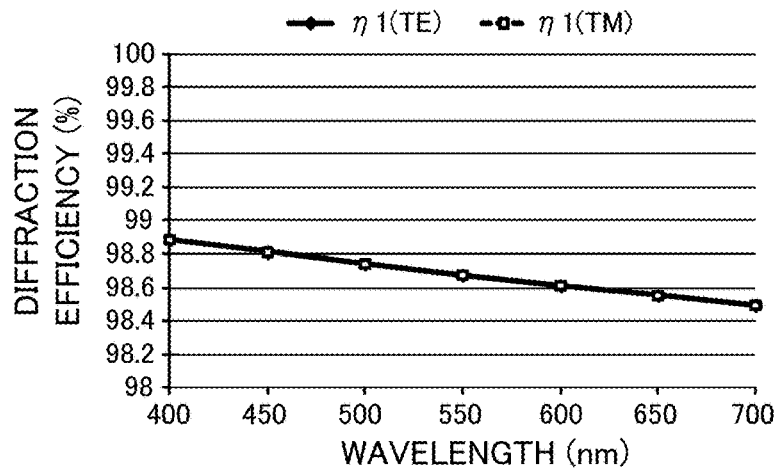
FIGS. 8A to 8C are graphs of diffraction efficiencies of +1st order diffracted light, 0th order diffracted light, and +2nd order diffracted light, respectively, for a light beam at a designed incident angle in a diffractive optical element as a comparative example.
Figure 8B:
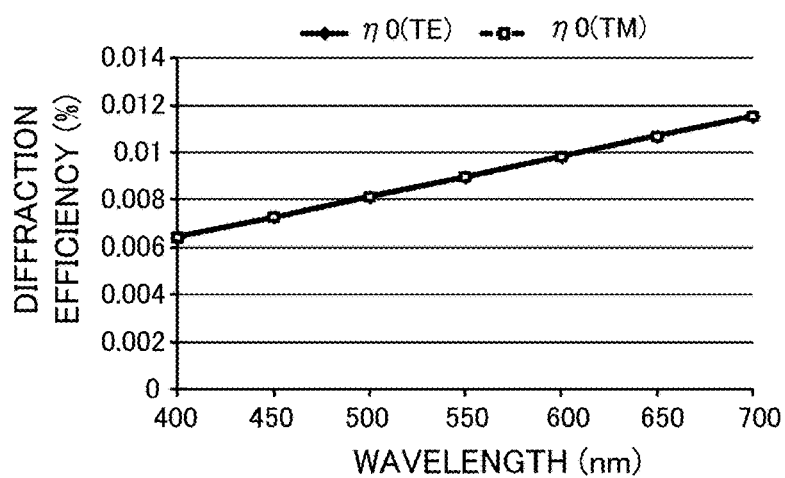
Figure 8C:
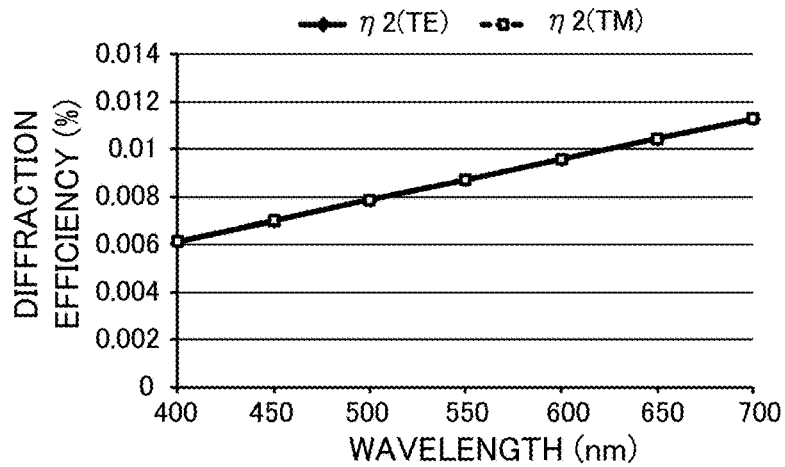

FIGS. 8A to 8C are graphs of diffraction efficiencies of the +1st order diffracted light, the 0th order diffracted light, and the +2nd order diffracted light, respectively, for a light beam at a designed incident angle in a diffractive optical element as a comparative example. In other words, FIGS. 8A to 8C are graphs as a comparative example, corresponding to FIGS. 7A to 7C, in which a diffractive optical element (DOE) having the same configuration as that of FIG. 1 except that the thin film 11 is not provided is used. Compared with the diffraction grating which does not include the thin film, the diffraction efficiencies of the +1st diffracted light of the TE polarization and the TM polarization is improved, and on the other hand, the diffraction efficiencies of the 0th order diffracted light and the +2nd order diffracted light are decreased over an entire visible wavelength band. While the numerical values of the diffraction efficiencies of the 0th order diffracted light and the +2nd order diffracted light are small, the effect of this embodiment is large since they are influenced as unnecessary light in a photography with a high-luminance light source, a small aperture stop, a long-time exposure or the like.

Figure 9:
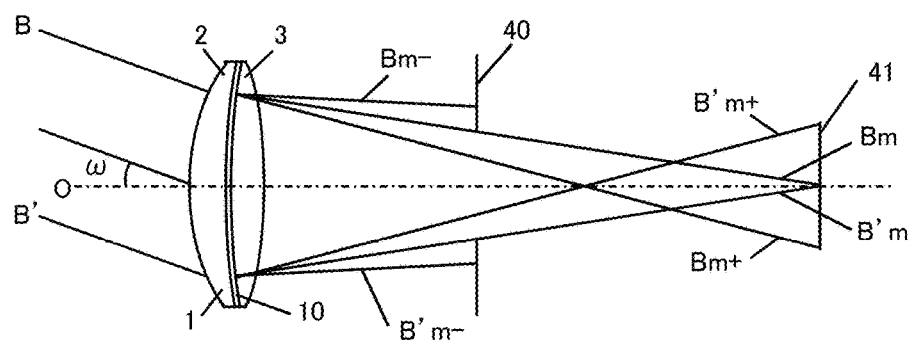
FIG. 9 is an explanatory diagram of an influence of unnecessary light at an oblique incident angle (off-screen light incident angle) relating to the optical system of FIG. 4 in Embodiment 1.
Figure 10A:
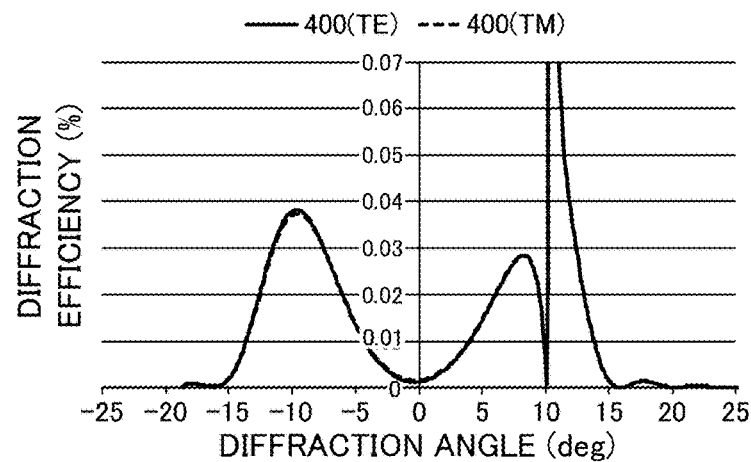
FIGS. 10A to 10C are graphs of diffraction efficiencies of wavelengths 400 nm, 550 nm, and 700 nm, respectively, for a light beam at an off-screen incident angle of +10 degrees in the diffractive optical element of Embodiment 1.
Figure 10B:
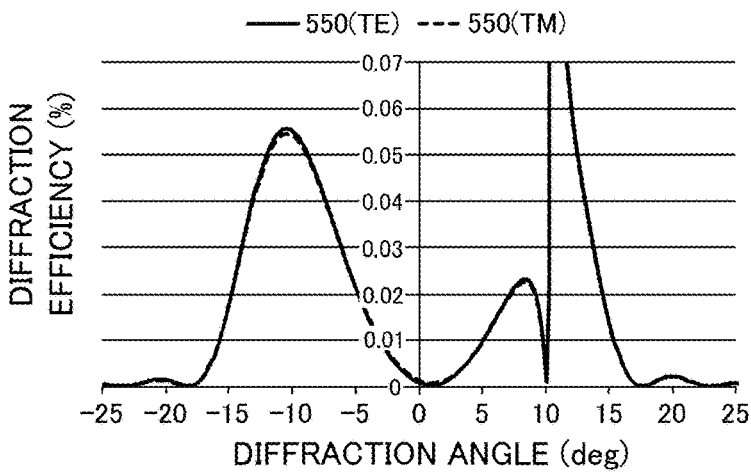
Figure 10C:
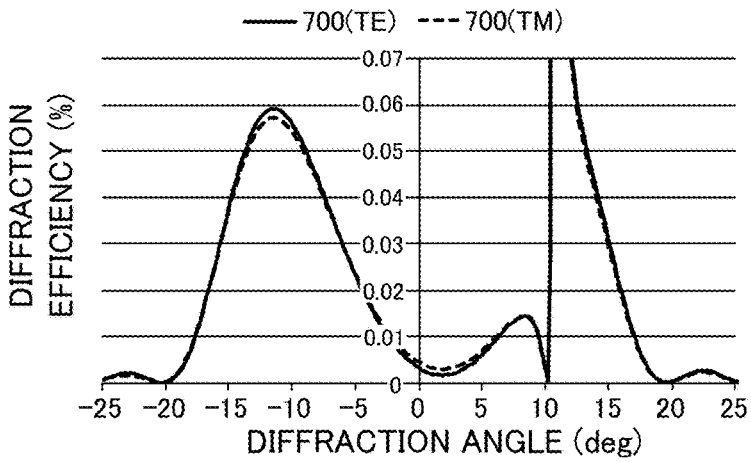

FIG. 9 is an explanatory diagram of an influence of unnecessary light at an oblique incident angle (off-screen light incident angle) relating to the optical system of FIG. 4. In FIG. 5, the incident angles of the off-screen light beams B and B' with respect to the m grating and the m' grating for the directions of the center of gravity of the ray are angles ωi and ωi', respectively. FIG. 10A to 10C are graphs of diffraction efficiencies of wavelengths 400 nm, 550 nm, and 700 nm, respectively, for a light beam at an off-screen incident angle of +10 degrees in the diffractive optical element. In other words, assuming the off-screen incident light beam b illustrated in FIG. 3 and the incident light beam B illustrated in FIGS. 5 and 9, FIGS. 10A to 10C illustrate an RCWA calculation result at an incident angle of +10 degrees with a grating pitch of 100 μm. A direction of an incident angle is positive in a downward direction of FIG. 3.

Figure 11A:
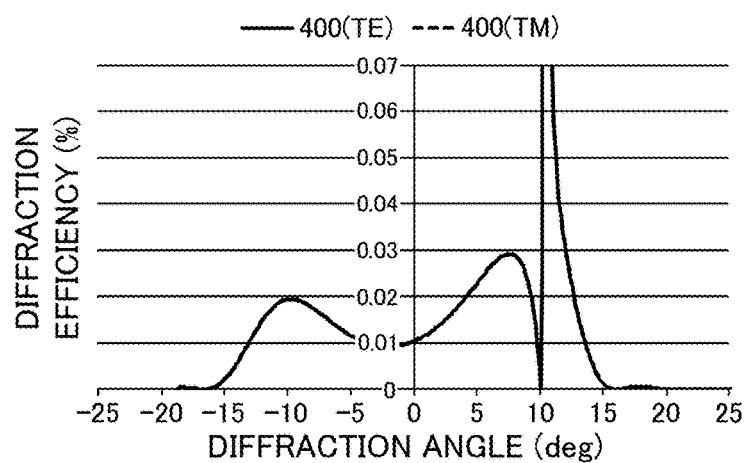
FIGS. 11A to 11C are graphs of diffraction efficiencies of wavelengths 400 nm, 550 nm, and 700 nm, respectively, for a light beam at an off-screen incident angle of +10 degrees in the diffractive optical element as a comparative example.
Figure 11B:
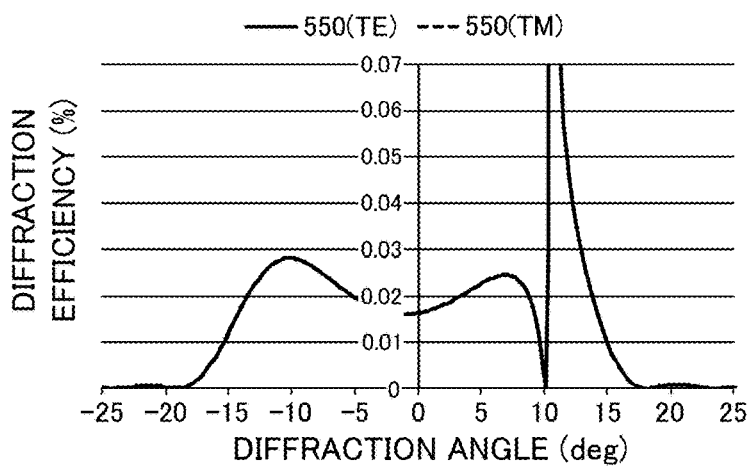
Figure 11C:
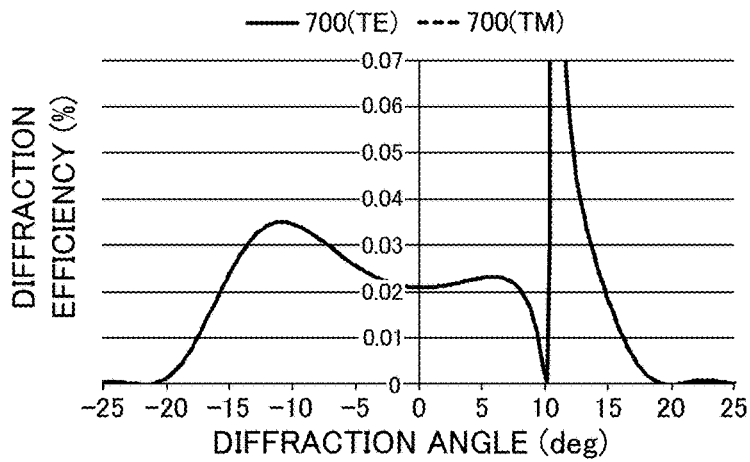

FIGS. 10A to 10C are results of enlarging a portion where the diffraction efficiency of the vertical axis is low and changing the lateral axis from the diffraction order to the diffraction angle to indicate a high diffraction angle range. Numerical values at the vicinity of +10 degrees exceed a displayed range because they correspond to the diffraction efficiency near the +1st order diffracted light as a designed order and accordingly the diffraction efficiency is high. While the diffraction efficiencies of the +1st order diffracted light as a designed order are concentrated, the +1st order diffracted light does not reach the imaging plane, and accordingly the influence is small. FIGS. 10A to 10C are results of the TE polarization and the TM polarization for wavelengths 400 nm, 550 nm, and 700 nm, respectively. As illustrated in FIGS. 10A to 10C, unnecessary light is propagated as unnecessary light having a peak in a specific angle direction. The unnecessary light has a peak in a direction of approximately −10 degrees, and this propagation direction is approximately equal to an emission direction of −10 degrees in which components of light beams, having an off-screen incident angle of +10 degrees, entering the grating wall surface are totally reflected and propagated. FIGS. 11A to 11C are graphs of diffraction efficiencies of wavelengths 400 nm, 550 nm, and 700 nm, respectively, for a light beam at an off-screen incident angle of +10 degrees in the diffractive optical element as a comparative example. FIGS. 11A to 11C are graphs as a comparative example, corresponding to FIGS. 10A to 10C, in which a diffractive optical element having the same configuration as that of FIG. 3 except that the thin film 11 is not provided is used.

The unnecessary light which emits at the vicinity of the diffraction angle of +0.19 degree of the +1st order diffracted light as a designed incident angle in unnecessary light which is incident at +10 degrees as off-screen light incident light reaches the image plane ("Bm" in FIG. 9). A diffraction order and a diffraction angle at which the unnecessary light of the off-screen incident light reaches the image plane vary depending on an optical system disposed at a subsequent stage of the diffractive optical element ("Bm" to "Bm+" in FIG. 9). However, even in any optical systems, diffracted light of the unnecessary light caused by the off-screen light that approximately coincides with the diffraction angle at which the designed diffraction order at least the designed incident angle is propagated reaches the image plane, and accordingly the imaging performance is decreased. An angle of the peak of the unnecessary light in a direction of −10 degrees illustrated in FIGS. 10A to 10C is approximately the same as that of FIGS. 11A to 11C. However, a spread of the unnecessary light illustrated in FIGS. 10A to 10C and a spread of the unnecessary light illustrated in FIGS. 11A to 11C are different from each other, and the diffraction efficiencies at the diffraction angle near +0.19 degree illustrated in FIGS. 10A to 10C are decreased over an entire visible wavelength band for both the TE polarization and the TM polarization. In this embodiment, with respect to the unnecessary light, parts of the light beams "b" that are incident near the grating wall surface are confined inside the thin film 11 and are propagated as an optical waveguide, and as a result of these light beams that interfere with each other after being emitted, light beams reaching the image plane may be decreased compared with the comparative example.

Figure 12A:
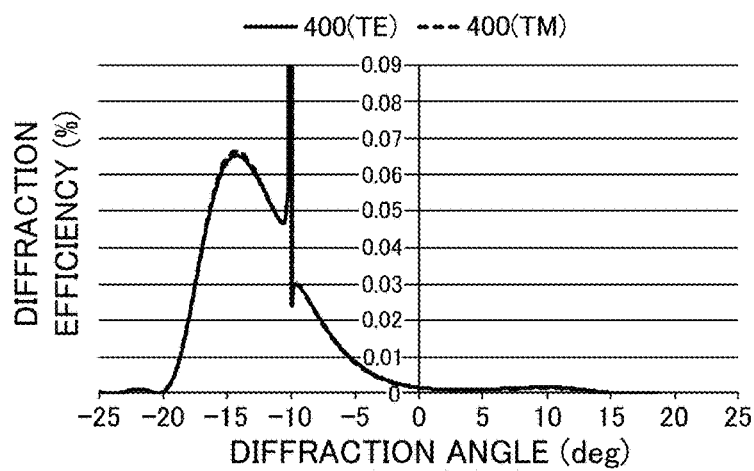
FIGS. 12A to 12C are graphs of diffraction efficiencies of wavelengths 400 nm, 550 nm, and 700 nm, respectively, for a light beam at an off-screen incident angle of −10 degrees in the diffractive optical element of Embodiment 1.
Figure 12B:
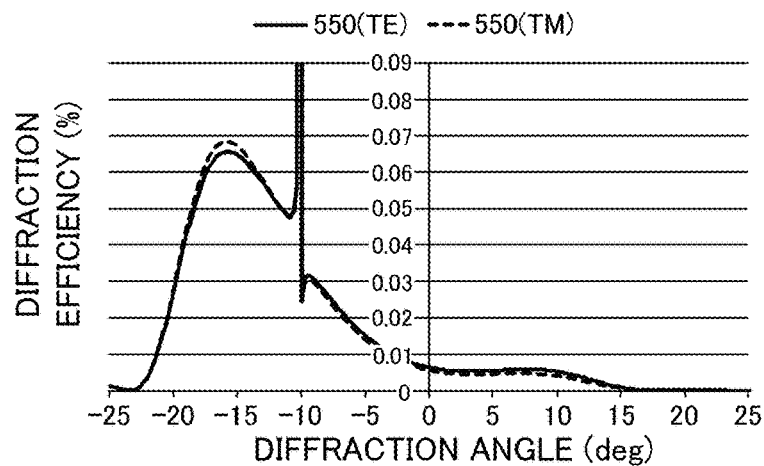
Figure 12C:
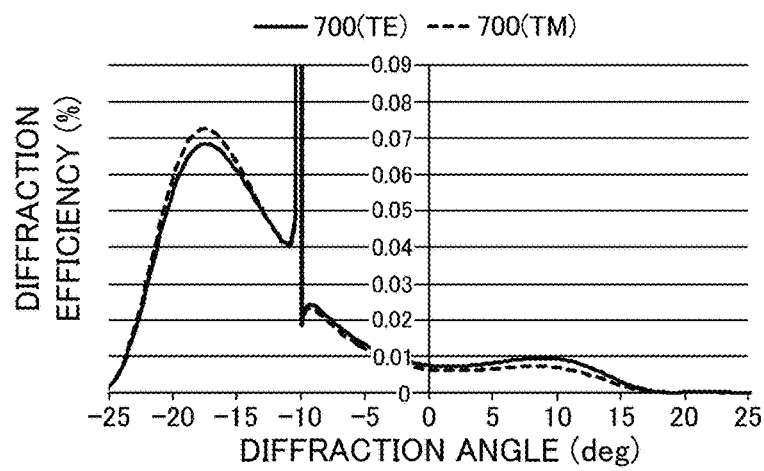

FIG. 12A to 12C are graphs of diffraction efficiencies of wavelengths 400 nm, 550 nm, and 700 nm, respectively, for a light beam at an off-screen incident angle of −10 degrees in the diffractive optical element of this embodiment. In other words, assuming the incident light beam c illustrated in FIG. 3 and the incident light beam B' illustrated in FIGS. 5 and 9, FIGS. 12A to 12C illustrate RCWA calculation results at an incident angle of −10 degrees with a grating pitch of 100 μm. The incident angle is positive in a downward direction of FIG. 3 (the incident angle is positive in an upward direction for the m' grating in FIG. 5). FIGS. 12A to 12C are results of enlarging a portion where the diffraction efficiency of the vertical axis is low and changing the lateral axis from the diffraction order to the diffraction angle to indicate a high diffraction angle range. Numerical values at the vicinity of −10 degrees exceed a displayed range because the diffraction efficiency near the +1st order diffracted light as a designed order is high. While the diffraction efficiencies of the +1st order diffracted light as a designed order are concentrated, the +1st order diffracted light does not reach the imaging plane, and accordingly the influence is small. FIGS. 12A to 12C are results of the TE polarization and the TM polarization for wavelengths 400 nm, 550 nm, and 700 nm, respectively.

Figure 13A:
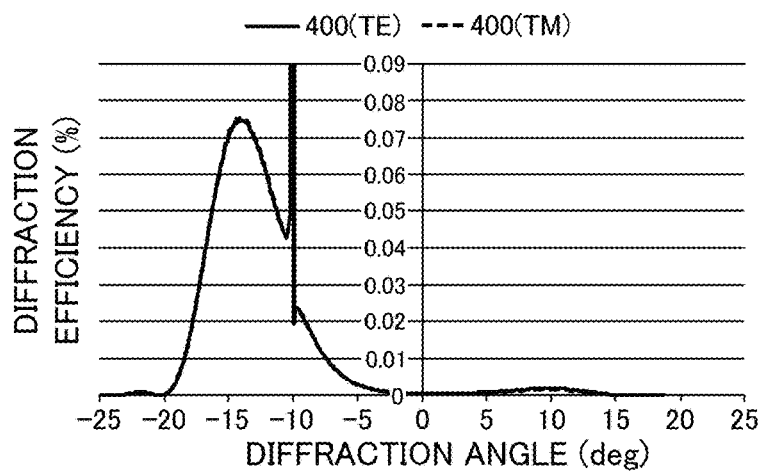
FIGS. 13A to 13C are graphs of diffraction efficiencies of wavelengths 400 nm, 550 nm, and 700 nm, respectively, for a light beam at an off-screen incident angle of −10 degrees in the diffractive optical element as a comparative example.
Figure 13B:
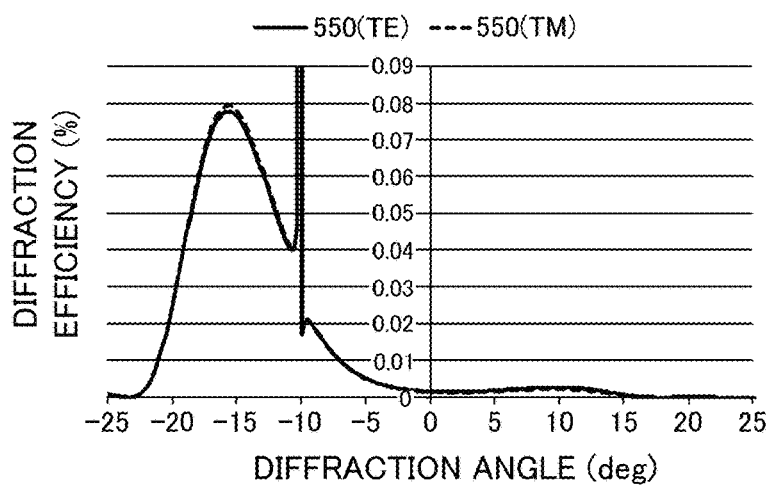
Figure 13C:
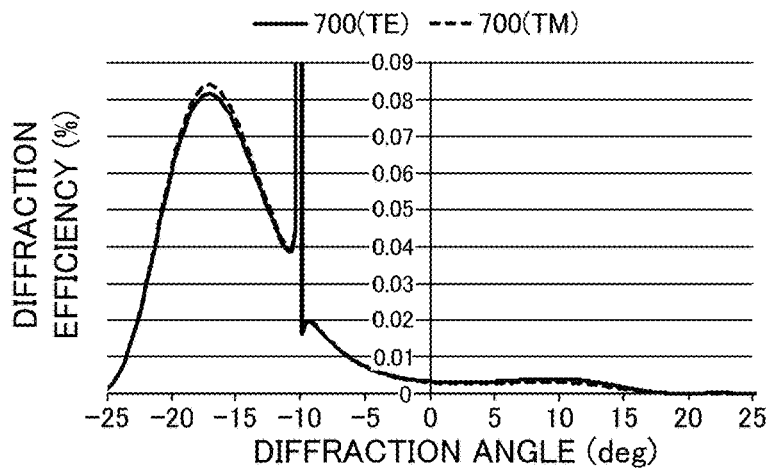

FIG. 13A to 13C are graphs of diffraction efficiencies of wavelengths 400 nm, 550 nm, and 700 nm, respectively, for a light beam at an off-screen incident angle of −10 degrees in the diffractive optical element as a comparative example. FIGS. 13A to 13C are graphs as a comparative example, corresponding to FIGS. 12A to 12C, in which a diffractive optical element having the same configuration as that of FIG. 3 except that the thin film 11 is not provided is used. As illustrated in FIGS. 12A to 12C, the unnecessary light is propagated as unnecessary light having a peak in a specific angle direction. Compared with FIGS. 13A to 13C, the peak of the unnecessary light in a positive (+) direction increases, and on the other hand the peak of the unnecessary light in a negative (−) direction decreases. This means that the unnecessary light in the positive (+) direction increases due to the reflection of a part of the light beams incident on the grating wall surface from the low refractive index medium and the unnecessary light caused by the transmission in the negative (−) direction decreases. In the optical system illustrated in FIGS. 4 and 9, diffracted light of the unnecessary light caused by the off-screen light which approximately coincides with the diffraction angle of +0.19 degree at which the designed diffraction order at the designed incident angle is propagated increases compared with the comparative example. However, the diffraction efficiency is extremely low and the influence of the m grating is rather large, and accordingly, the influence on the decrease of the imaging performance is small.

As described above, in the optical system to which the diffractive optical element of this embodiment is applied, the increase of unnecessary light for the m' grating in which the influence of the unnecessary light is small is suppressed so as to be little influence, and unnecessary light for the m grating in which the influence of the unnecessary light is large can be significantly reduced. As a result, the unnecessary light reaching the imaging plane is little, and accordingly the decrease of the imaging performance can be suppressed. In this embodiment, the grating pitch is 100 μm. For the annular zone having a wide grating pitch, the contribution of the wall surface is small, and accordingly the diffraction efficiency of the designed order is relatively high and the diffraction efficiency of the unnecessary light is relatively low. A propagation direction of the unnecessary light does not depend on the grating pitch, and thus the propagation direction is constant depending on the grating pitch (not illustrated). Accordingly, as one of bases, the diffraction efficiency for the grating pitch of 100 μm is described.

In this embodiment, the incident angles of the off-screen light beams B and B' are assumed to be +10 degrees as an off-screen incident angle (incident angle ω of +13.16 degrees with respect to the optical axis direction). At angles smaller than this incident angle, unnecessary light of the diffractive optical element is relatively inconspicuous due to ghost caused by reflection on a lens surface or an imaging plane and much scattering caused by microasperity on a lens surface or an inside of a lens. On the other hand, at angles larger than this incident angle, the influence of the unnecessary light of the diffractive optical element is relatively small due to the light shielding of reflection on a front-side lens surface or a lens barrel. Accordingly, the off-screen incident light beam at the vicinity of +10 degrees has the greatest influence on the unnecessary light of the diffractive optical element, and the incident angle of the off-screen light beam is assumed to be approximately +10 degrees in this embodiment.

Embodiment 2

Next, a diffractive optical element in Embodiment 2 of the present invention will be described. In the diffractive optical element of this embodiment, a material of the thin film 11 is the same as that in Embodiment 1 and a width W of the thin film 11 is 450 nm. Other configurations of the diffractive optical element are the same as those in Embodiment 1. Table 2, similarly to Table 1, indicates parameters of the diffractive optical element and numerical values of respective expressions for each wavelength $\lambda$ (nm) in this embodiment.

TABLE 2

| | $\lambda$ | | | | | | |
|---|---|---|---|---|---|---|---|
| | 400 | 450 | 500 | 550 | 600 | 650 | 700 |
| $n_1$ | 1.66330 | 1.65760 | 1.65350 | 1.65050 | 1.64820 | 1.64630 | 1.64480 |
| $n_2$ | 1.64626 | 1.63549 | 1.62822 | 1.62298 | 1.61903 | 1.61596 | 1.61352 |
| $n_3$ | 1.60919 | 1.59379 | 1.58189 | 1.57201 | 1.56343 | 1.55573 | 1.54865 |
| d (μm) | 10.79 | 10.79 | 10.79 | 10.79 | 10.79 | 10.79 | 10.79 |
| W (nm) | 450 | 450 | 450 | 450 | 450 | 450 | 450 |
| $\Delta$ | 0.0102 | 0.0132 | 0.0152 | 0.0165 | 0.0175 | 0.0183 | 0.0188 |
| $\Delta/\lambda$ | 0.0255 | 0.0294 | 0.0303 | 0.0301 | 0.0292 | 0.0281 | 0.0269 |
| a' | 2.1399 | 1.8496 | 1.7929 | 1.8076 | 1.8568 | 1.9303 | 2.0125 |
| $W_{c,TE}$ (nm) | 260 | 249 | 257 | 272 | 290 | 311 | 334 |
| $W_{c,TM}$ (nm) | 269 | 258 | 268 | 285 | 305 | 329 | 353 |
| $W_c$ (nm) | 264 | 254 | 263 | 278 | 298 | 320 | 344 |
| $W/W_c$ | 1.70 | 1.77 | 1.71 | 1.62 | 1.51 | 1.41 | 1.31 |
| $n_{eq,TE}$ | 1.64966 | 1.64028 | 1.63318 | 1.62753 | 1.62287 | 1.61895 | 1.61567 |
| $n_{eq,TM}$ | 1.64941 | 1.63989 | 1.63267 | 1.62694 | 1.62223 | 1.61829 | 1.61504 |
| $n_{eq}$ | 1.64953 | 1.64009 | 1.63293 | 1.62723 | 1.62255 | 1.61862 | 1.61535 |
| $(n_{eq} - n_2)d/\lambda$ | 0.0883 | 0.1102 | 0.1016 | 0.0834 | 0.0633 | 0.0441 | 0.0283 |

Figure 14A:
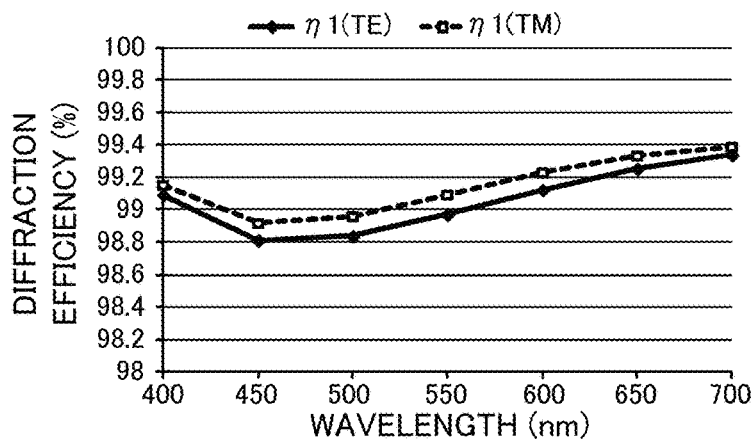
FIGS. 14A to 14C are graphs of diffraction efficiencies of +1st order diffracted light, 0th order diffracted light, and +2nd order diffracted light, respectively, for a light beam at a designed incident angle in a diffractive optical element of Embodiment 2.
Figure 14B:
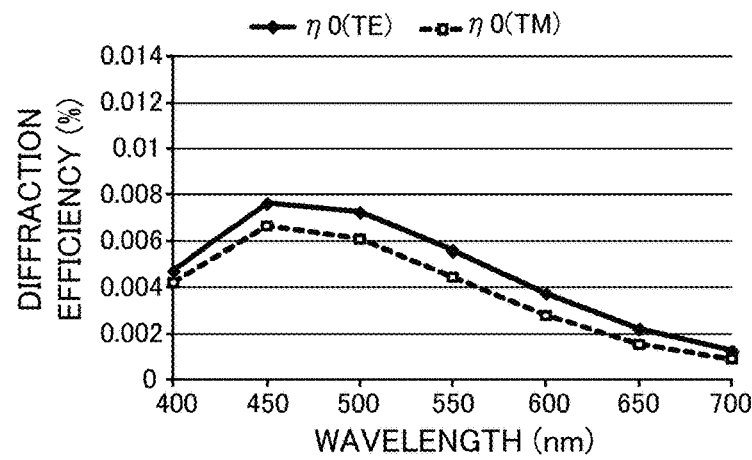
Figure 14C:
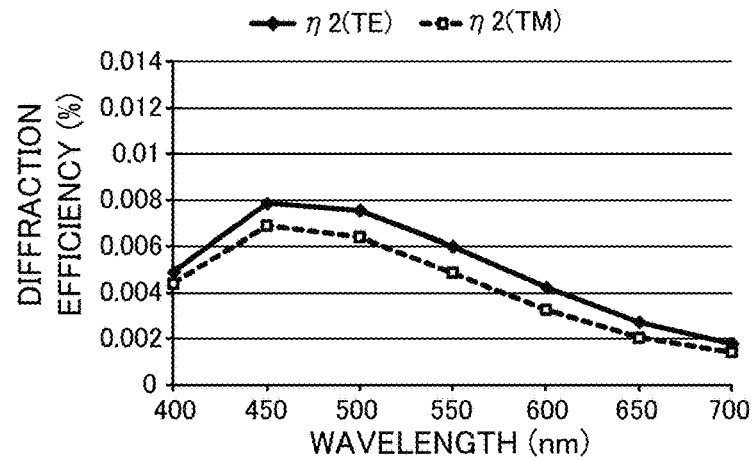

FIGS. 14A to 14C are graphs of diffraction efficiencies of the +1st order diffracted light, the 0th order diffracted light, and the +2nd order diffracted light, respectively, for a light beam at a designed incident angle in a diffractive optical element of this embodiment. In other words, FIGS. 14A to 14C illustrate an RCWA calculation result at an incident angle of 0 degree with a grating pitch of 100 μm. Compared with the diffraction grating which does not include the thin film, the diffraction efficiencies of the +1st diffracted light for both the TE polarization and the TM polarization are improved, and on the other hand, the diffraction efficiencies of the 0th order diffracted light and the +2nd order diffracted light are decreased over an entire visible wavelength band.

Figure 15A:
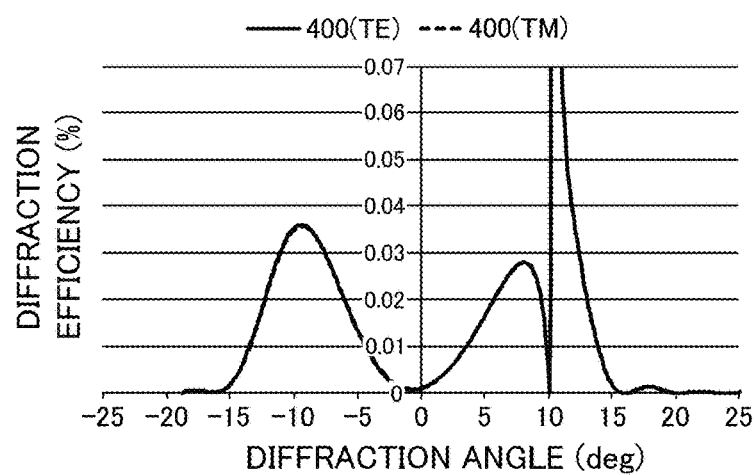
FIGS. 15A to 15C are graphs of diffraction efficiencies of wavelengths 400 nm, 550 nm, and 700 nm, respectively, for a light beam at an off-screen incident angle of +10 degrees in the diffractive optical element of Embodiment 2.
Figure 15B:
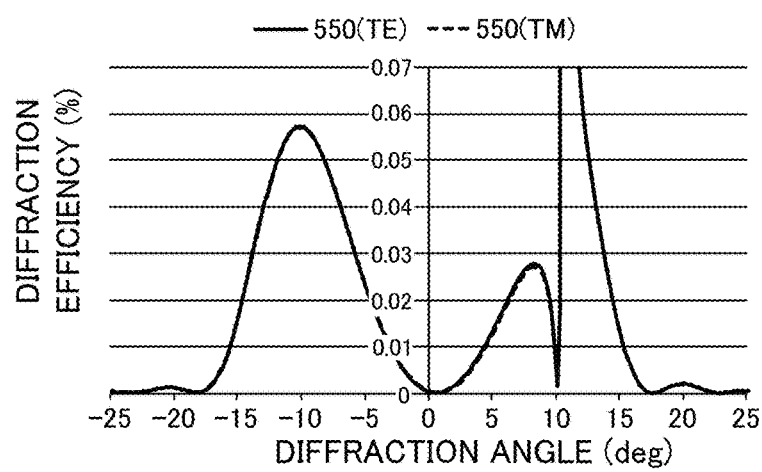
Figure 15C:
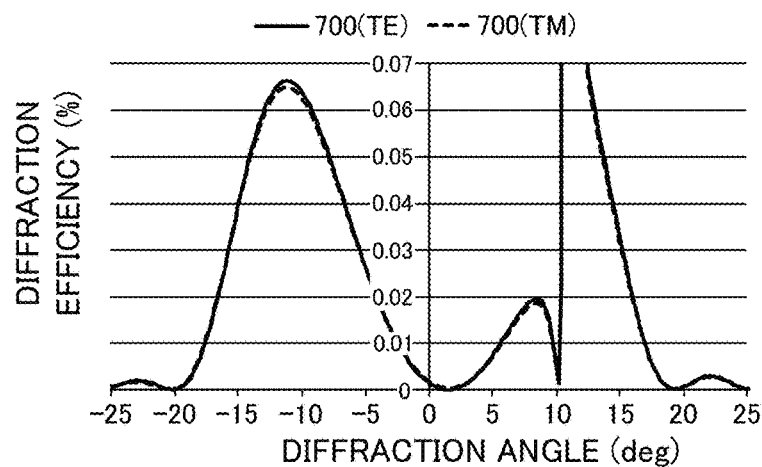

FIG. 15A to 15C are graphs of diffraction efficiencies of wavelengths 400 nm, 550 nm, and 700 nm, respectively, for a light beam at an off-screen incident angle of +10 degrees in the diffractive optical element of this embodiment. In other words, FIGS. 15A to 15C illustrate an RCWA calculation result at an incident angle of +10 degrees with a grating pitch of 100 μm. Compared with the diffraction grating which does not include the thin film, the diffraction efficiencies at the vicinity of the diffraction angle of +0.19 degree with respect to both the TE polarization and the TM polarization are decreased over the entire visible wavelength band.

Embodiment 3

Next, a diffractive optical element in Embodiment 3 of the present invention will be described. In the diffractive optical element of this embodiment, a material of the thin film 11 is the same as that in Embodiment 1 and a width W of the thin film 11 is 300 nm. Other configurations of the diffractive optical element are the same as those in Embodiment 1. Table 3, similarly to Table 1, indicates parameters of the diffractive optical element and numerical values of respective expressions for each wavelength λ (nm) in this embodiment.

Figure 18:
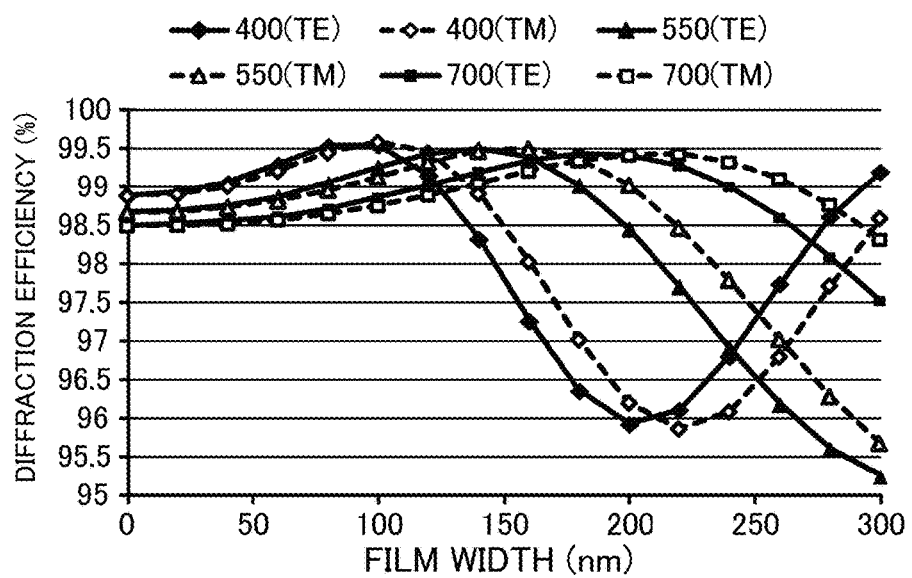
FIG. 18 is a graph of a diffraction efficiency of +1st order diffracted light for a light beam at a designed incident angle in the diffractive optical element as a comparative example.

Japanese Patent Laid-open No. 2014-170109, and it illustrates an RCWA calculation result of the diffraction efficiency of the +1st order diffracted light at an incident angle of 0 degree when the relative refractive index difference Δ of expression (6) is 0.045 with a change of the film width of the thin film. This diffractive optical element has characteristics of $n_1$=1.70135, $n_2$=1.62298, $n_3$=1.57243, and Δ/λ=0.0818 for the wavelength of 550 nm. FIG. 18 illus-

TABLE 3

| | λ | | | | | | |
|---|---|---|---|---|---|---|---|
| | 400 | 450 | 500 | 550 | 600 | 650 | 700 |
| $n_1$ | 1.66330 | 1.65760 | 1.65350 | 1.65050 | 1.64820 | 1.64630 | 1.64480 |
| $n_2$ | 1.64626 | 1.63549 | 1.62822 | 1.62298 | 1.61903 | 1.61596 | 1.61352 |
| $n_3$ | 1.60919 | 1.59379 | 1.58189 | 1.57201 | 1.56343 | 1.55573 | 1.54865 |
| d (μm) | 10.79 | 10.79 | 10.79 | 10.79 | 10.79 | 10.79 | 10.79 |
| W (nm) | 300 | 300 | 300 | 300 | 300 | 300 | 300 |
| Δ | 0.0102 | 0.0132 | 0.0152 | 0.0165 | 0.0175 | 0.0183 | 0.0188 |
| Δ/λ | 0.0255 | 0.0294 | 0.0303 | 0.0301 | 0.0292 | 0.0281 | 0.0269 |
| a' | 2.1399 | 1.8496 | 1.7929 | 1.8076 | 1.8568 | 1.9303 | 2.0125 |
| $W_{c,TE}$ (nm) | 260 | 249 | 257 | 272 | 290 | 311 | 334 |
| $W_{c,TM}$ (nm) | 269 | 258 | 268 | 285 | 305 | 329 | 353 |
| $W_c$ (nm) | 264 | 254 | 263 | 278 | 298 | 320 | 344 |
| $W/W_c$ | 1.13 | 1.18 | 1.14 | 1.08 | 1.01 | 0.94 | 0.87 |
| $n_{eq,TE}$ | 1.64656 | 1.63611 | 1.62871 | 1.62321 | 1.61906 | — | — |
| $n_{eq,TM}$ | 1.64645 | 1.63590 | 1.62849 | 1.62304 | — | — | — |
| $n_{eq}$ | 1.64650 | 1.63600 | 1.62860 | 1.62312 | — | — | — |
| $(n_{eq} - n_2)d/\lambda$ | 0.0066 | 0.0123 | 0.0081 | 0.0028 | — | — | — |

For a wavelength longer than or equal to 600 nm, the width W of the thin film 11 is narrower than the cutoff width in a single mode represented by expression (10) for the TE polarization and by expression (11) for the TM polarization. Therefore, each of expressions (7) and (8) does not have any solution and thus the equivalent refractive index cannot be obtained.

Figure 16A:
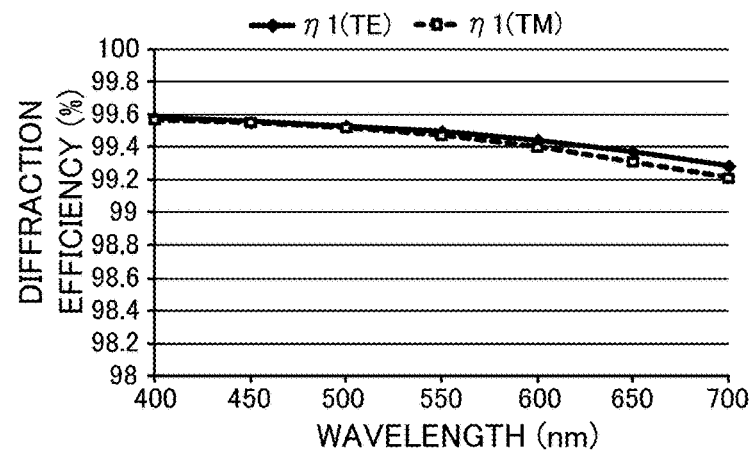
FIGS. 16A to 16C are graphs of diffraction efficiencies of +1st order diffracted light, 0th order diffracted light, and +2nd order diffracted light, respectively, for a light beam at a designed incident angle in the diffractive optical element of Embodiment 3.
Figure 16B:
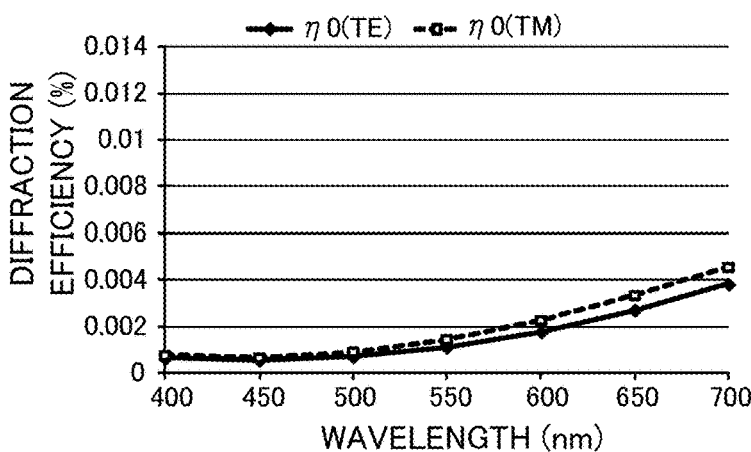
Figure 16C:
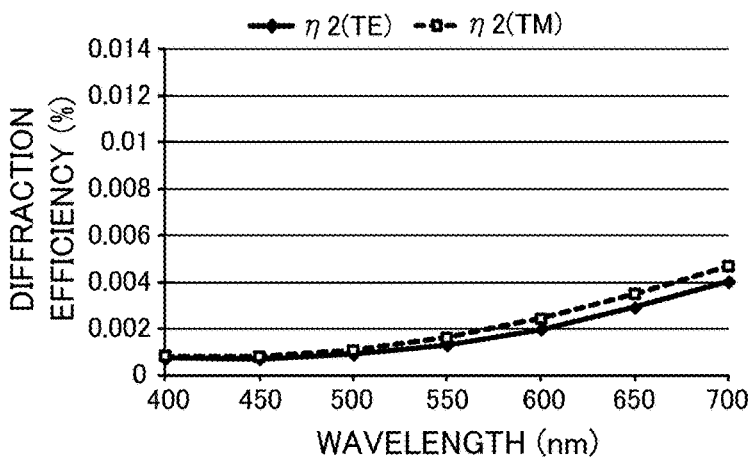

FIGS. 16A to 16C are graphs of diffraction efficiencies of the +1st order diffracted light, the 0th order diffracted light, and the +2nd order diffracted light, respectively, for a light beam at a designed incident angle in the diffractive optical element of this embodiment. In other words, FIGS. 16A to 16C illustrate an RCWA calculation result at an incident angle of 0 degree with a grating pitch of 100 μm. Compared with the diffraction grating which does not include the thin film, the diffraction efficiencies of the +1st diffracted light for both the TE polarization and the TM polarization are improved, and on the other hand, the diffraction efficiencies of the 0th order diffracted light and the +2nd order diffracted light are decreased over an entire visible wavelength band.

Figure 17A:
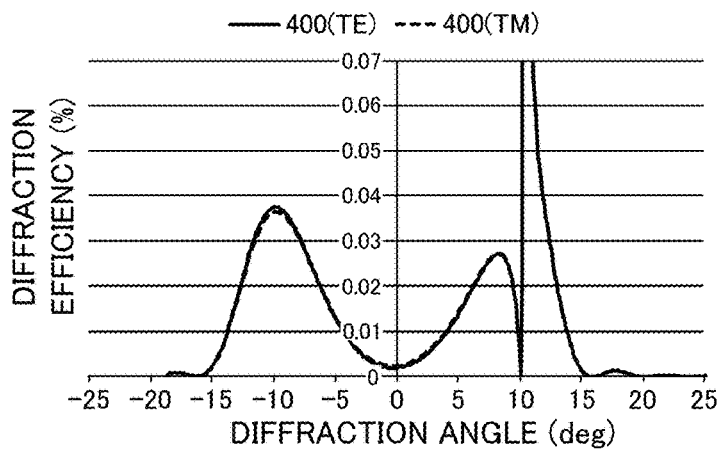
FIGS. 17A to 17C are graphs of diffraction efficiencies of wavelengths 400 nm, 550 nm, and 700 nm, respectively, for a light beam at an off-screen incident angle of +10 degrees in the diffractive optical element of Embodiment 3.
Figure 17B:
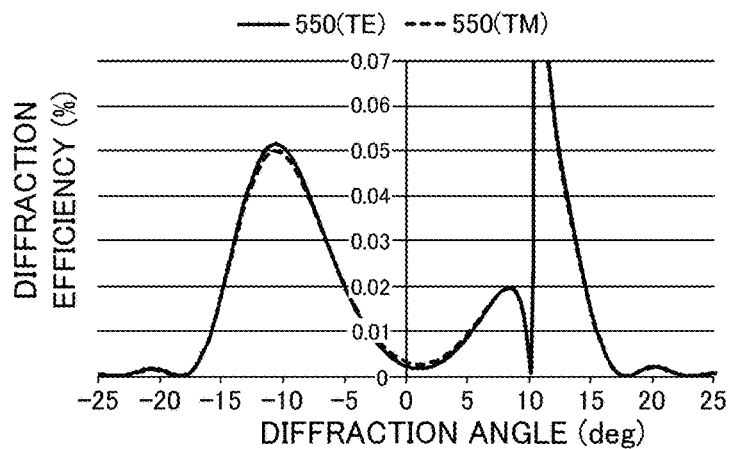
Figure 17C:
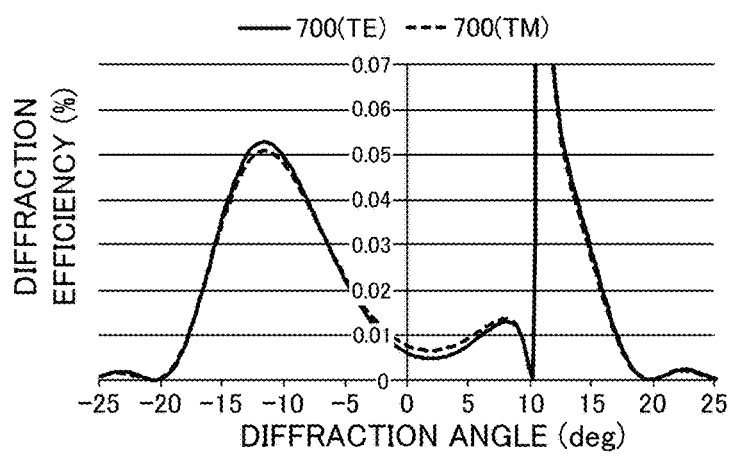

FIGS. 17A to 17C are graphs of diffraction efficiencies of wavelengths 400 nm, 550 nm, and 700 nm, respectively, for a light beam at an off-screen incident angle of +10 degrees in the diffractive optical element of this embodiment. In other words, FIGS. 17A to 17C illustrate an RCWA calculation result at an incident angle of +10 degrees with a grating pitch of 100 μm. Compared with the diffraction grating which does not include the thin film, the diffraction efficiencies at the vicinity of the diffraction angle of +0.19 degree with respect to both the TE polarization and the TM polarization are decreased over the entire visible wavelength band.

Subsequently, a comparative example will be described to clarify the effect of this embodiment. FIG. 18 is a graph of a diffraction efficiency of the +1st order diffracted light for a light beam at a designed incident angle in the diffractive optical element as a comparative example. FIG. 18 corresponds to the diffractive optical element that is disclosed in trates a result of the grating pitch of 100 μm and each of the wavelengths 400 nm, 550 nm, and 700 nm. The film width in which the diffraction efficiency of the +1st order diffracted light is maximized varies depending on both the wavelength and the polarization, and thus there are high wavelength dependence and polarization dependence. For example, the film width of 200 to 220 nm where the diffraction efficiency for the TM polarization with the wavelength of 700 nm is peaked indicates an extremely low diffraction efficiency for the TE polarization with the wavelength of 400 nm.

Figure 19A:
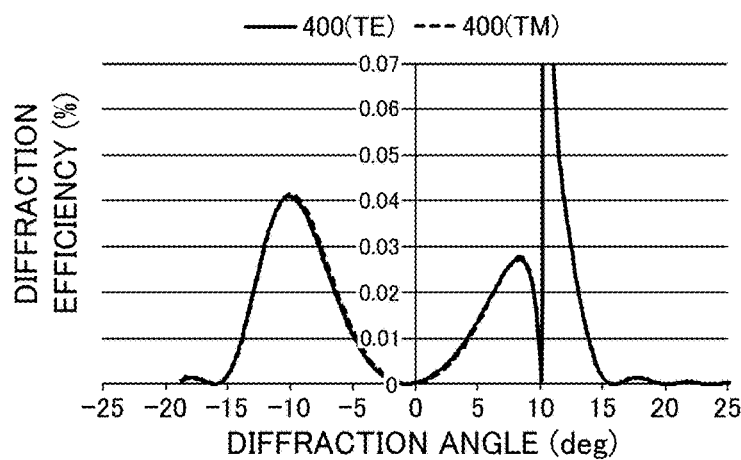
FIGS. 19A to 19C are graphs of diffraction efficiencies of wavelengths 400 nm, 550 nm, and 700 nm, respectively, for a light beam at an off-screen incident angle of +10 degrees in the diffractive optical element as a comparative example.
Figure 19B:
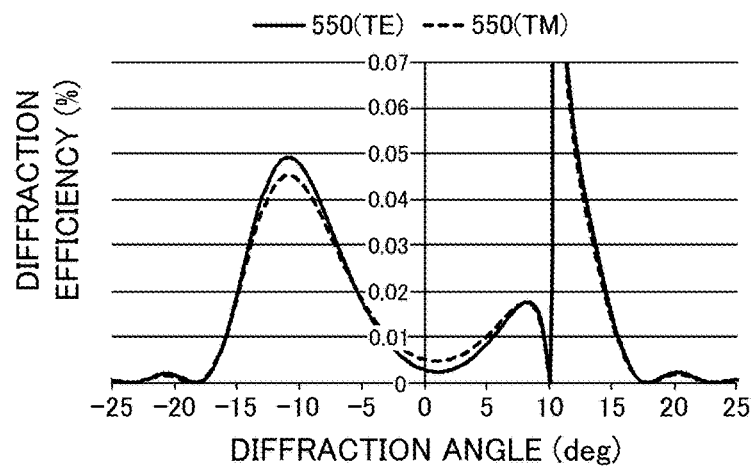
Figure 19C:
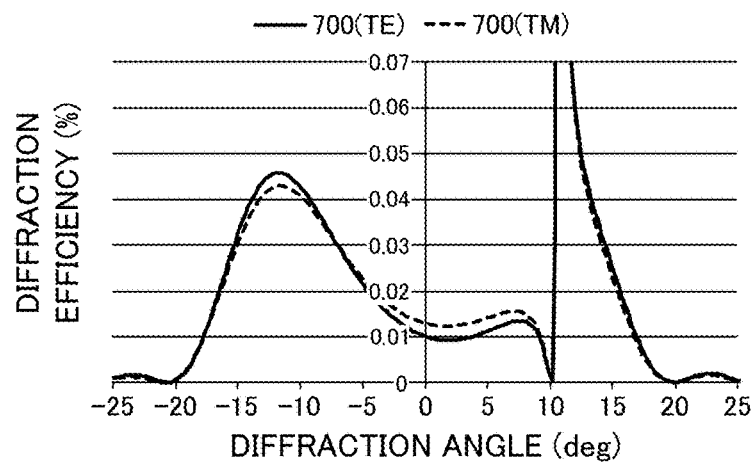

FIGS. 19A to 19C are graphs of diffraction efficiencies of wavelengths 400 nm, 550 nm, and 700 nm, respectively, for a light beam at an off-screen incident angle of +10 degrees in the diffractive optical element as a comparative example. In other words, FIGS. 19A to 19C illustrate an RCWA calculation result of the diffraction efficiency at an incident angle of +10 degrees when the relative refractive index difference Δ of expression (6) is 0.045 and the film width of the thin film is 120 nm (W/Wc=0.99). Compared with each of the wavelengths of 400 nm and 550 nm, the diffraction efficiency and the wavelength dependence are large at the vicinity of the diffraction angle of +0.19 degree for the wavelength of 700 nm, and the polarization dependences for the TE polarization and the TM polarization are also large. As a result, coloring of the flare increases.

Figure 20:
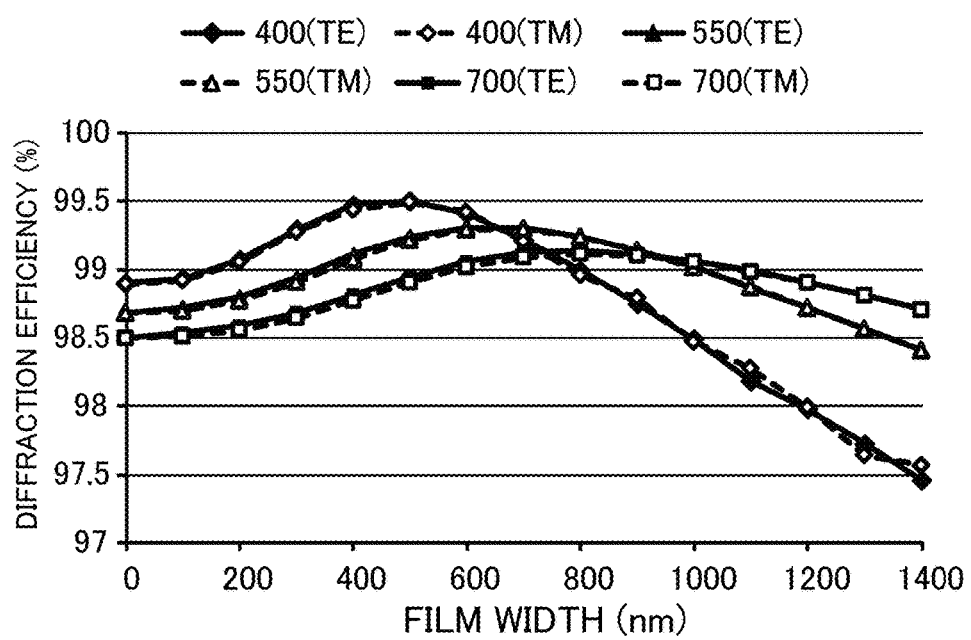
FIG. 20 is a graph of a diffraction efficiency of +1st order diffracted light for a light beam at a designed incident angle in the diffractive optical element as a comparative example.

FIG. 20 is a graph of a diffraction efficiency of +1st order diffracted light for a light beam at a designed incident angle in the diffractive optical element as a comparative example. FIG. 20 corresponds to the diffractive optical element that is disclosed in International Publication No. WO2011/099550, and it illustrates an RCWA calculation result of the diffraction efficiency of the +1st order diffracted light at an incident angle of 0 degree when the relative refractive index difference Δ of expression (6) is 0.005 with a change of the film width of the thin film. This diffractive optical element has characteristics of $n_1$=1.63116, $n_2$=1.62298, $n_3$=1.57243, and Δ/λ=0.0091 for the wavelength of 550 nm. FIG. 20 illustrates a result of the grating pitch of 100 μm and each of the wavelengths 400 nm, 550 nm, and 700 nm. The polarization dependence decreases compared with the result of FIG. 18. This is because the polarization dependence of the asymmetric three-layer flat plate waveguide depends on the relative refractive index difference Δ of expression (6). Accordingly, the polarization dependence of the equivalent refractive index in the waveguide mode is small when the relative refractive index difference Δ is small, and the polarization dependence is small even when being applied to the diffractive optical element.

Figure 21A:
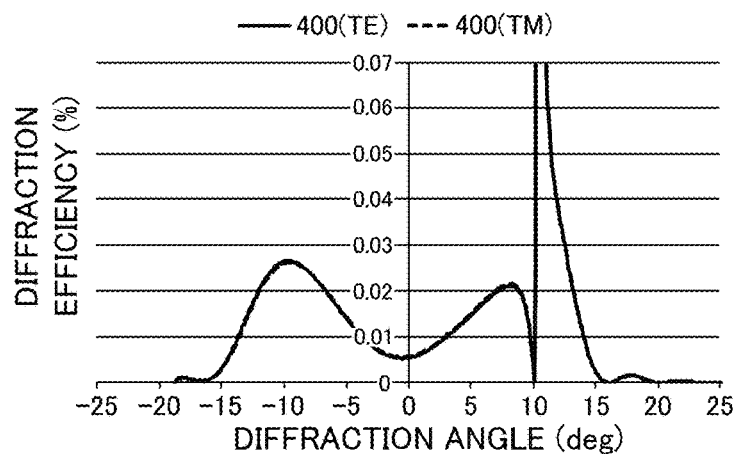
FIGS. 21A to 21C are graphs of diffraction efficiencies of wavelengths 400 nm, 550 nm, and 700 nm, respectively, for a light beam at an off-screen incident angle of +10 degrees in the diffractive optical element as a comparative example.
Figure 21B:
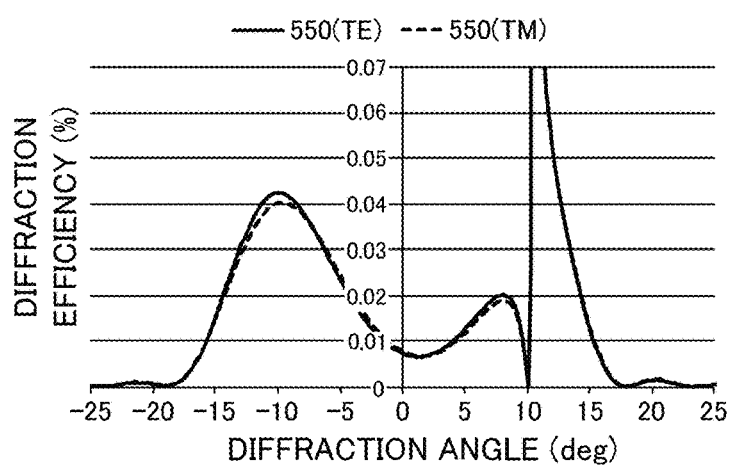
Figure 21C:
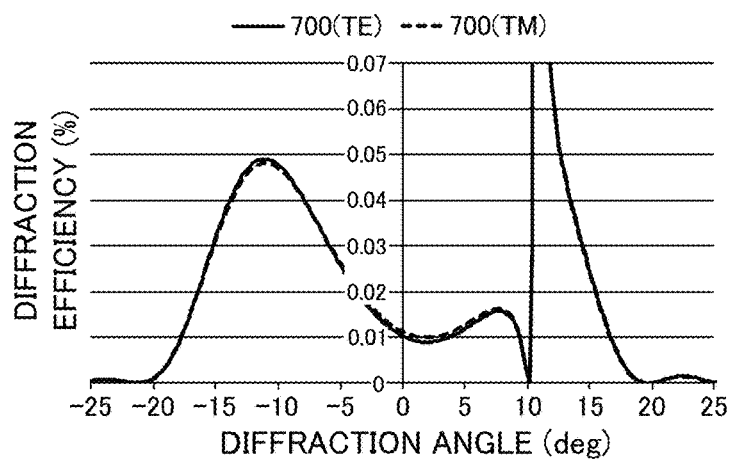

FIGS. 21A to 21C are graphs of diffraction efficiencies of wavelengths 400 nm, 550 nm, and 700 nm, respectively, for a light beam at an off-screen incident angle of +10 degrees in the diffractive optical element as a comparative example. In other words, FIGS. 21A to 21C illustrate an RCWA calculation result of the diffraction efficiency at an incident angle of +10 degrees when the relative refractive index difference Δ of expression (6) is 0.005 and the film width of the thin film is 700 nm (W/Wc=1.09). For any of the wavelengths of 400 nm, 550 nm, and 700 nm, the diffraction efficiencies at the vicinity of the diffraction angle of +0.19 are not sufficiently small.

Figure 22:
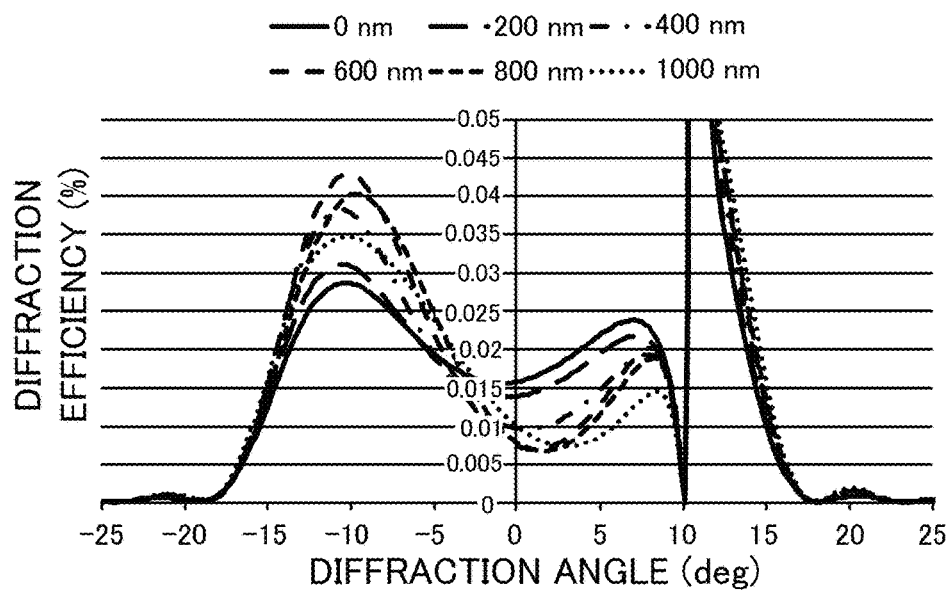
FIG. 22 is a graph of a diffraction efficiency of a wavelengths 550 nm for alight beam at an off-screen incident angle of +10 degrees in the diffractive optical element as a comparative example.

FIG. 22 is a graph of a diffraction efficiency of a wavelengths 550 nm for alight beam at an off-screen incident angle of +10 degrees in the diffractive optical element as a comparative example. In other words, FIG. 22 illustrates an RCWA calculation result of the diffraction efficiency for the TE polarization at an incident angle of +10 degrees with a wavelength of 550 nm when the film width of the thin film changes. When the relative refractive index difference Δ is small, a small diffraction efficiency cannot be obtained even if the film width is changed. This may be because a confinement coefficient of the waveguide is small in a small relative refractive index difference Δ, the +1st order diffracted light as designed diffracted light is reflected on the grating wall surface and thus it cannot be separated from flare light that is propagated in a direction of −10 degrees.

Embodiments 1 to 3. Compared with the result of FIG. 18, the wavelength dependence and the polarization dependence are reduced. With respect to the result at the incident angle of +10 degrees, as illustrated in FIGS. 10A to 10C, FIGS. 15A to 15C, and FIGS. 17A to 17C in Embodiments 1 to 3, the diffraction efficiencies at the diffraction angle near +0.19 degree are low compared with the results of FIGS. 21A to 21C and FIG. 22. Accordingly, unnecessary light reaching an imaging plane of unnecessary light incident at an obliquely incident angle can be reduced, and the wavelength dependence and the polarization dependence can be reduced.

Embodiment 4

Next, a diffractive optical element in Embodiment 4 of the present invention will be described. The diffractive optical element in this embodiment is different from the diffractive optical element in each of Embodiments 1 to 3, with respect to the refractive index $n_1$ and the width W of the thin film 11. In the diffractive optical element of this embodiment, the thin film 11 is constituted by a thin film of a material with a mixture of $Al_2O_3$ and $ZrO_2$, and a thickness or the width W of the thin film 11 in a direction perpendicular to the grating wall surface as a lamination plane is 160 nm. An extinction coefficient of the thin film 11 in a wavelength band from 400 nm to 700 nm is not greater than 0.0003. Specifically, the extinction coefficient of the thin film 11 is maximized with respect to light having the wavelength of 400 nm, and the extinction coefficient for the wavelength of 400 nm is 0.0002. Other configurations of the diffractive optical element are the same as those in each of Embodiments 1 to 3. Table 4, similarly to Table 1, indicates parameters of the diffractive optical element and numerical values of respective expressions for each wavelength λ (nm) in this embodiment.

TABLE 4

| | λ | | | | | | |
|---|---|---|---|---|---|---|---|
| | 400 | 450 | 500 | 550 | 600 | 650 | 700 |
| $n_1$ | 1.70345 | 1.69770 | 1.69365 | 1.69063 | 1.68830 | 1.68645 | 1.68493 |
| $n_2$ | 1.64626 | 1.63549 | 1.62822 | 1.62298 | 1.61903 | 1.61596 | 1.61352 |
| $n_3$ | 1.60919 | 1.59379 | 1.58189 | 1.57201 | 1.56343 | 1.55573 | 1.54865 |
| d (μm) | 10.79 | 10.79 | 10.79 | 10.79 | 10.79 | 10.79 | 10.79 |
| W (nm) | 160 | 160 | 160 | 160 | 160 | 160 | 160 |
| Δ | 0.0330 | 0.0360 | 0.0379 | 0.0392 | 0.0402 | 0.0409 | 0.0415 |
| Δ/λ | 0.0825 | 0.0799 | 0.0758 | 0.0713 | 0.0670 | 0.0630 | 0.0593 |
| a' | 0.6299 | 0.6494 | 0.6844 | 0.7264 | 0.7724 | 0.8208 | 0.8708 |
| $W_{c,TE}$ (nm) | 98 | 107 | 118 | 130 | 144 | 158 | 172 |
| $W_{c,TM}$ (nm) | 106 | 116 | 130 | 144 | 159 | 175 | 192 |
| $W_c$ (nm) | 102 | 112 | 124 | 137 | 151 | 166 | 182 |
| $W/W_c$ | 1.57 | 1.43 | 1.29 | 1.17 | 1.06 | 0.96 | 0.88 |
| $n_{eq,TE}$ | 1.65184 | 1.63976 | 1.63092 | 1.62432 | 1.61943 | 1.61597 | — |
| $n_{eq,TM}$ | 1.65040 | 1.63827 | 1.62960 | 1.62337 | 1.61903 | — | — |
| $n_{eq}$ | 1.65112 | 1.63901 | 1.63026 | 1.62384 | 1.61923 | — | — |
| $(n_{eq} - n_2)d/λ$ | 0.1311 | 0.0844 | 0.0440 | 0.0170 | 0.0036 | — | — |

Figure 23:
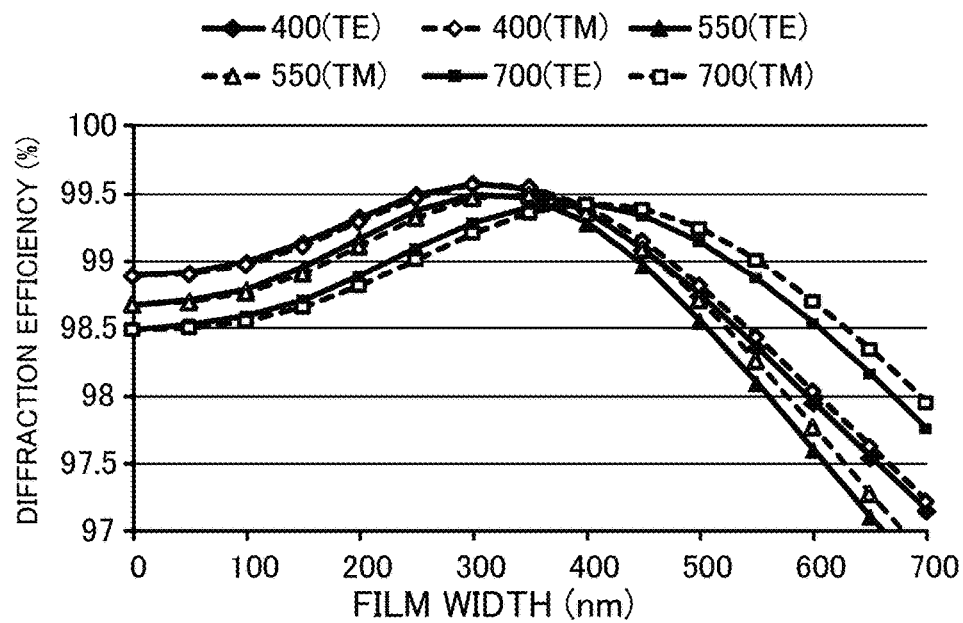
FIG. 23 is a graph of a diffraction efficiency of +1st order diffracted light for a light beam at a designed incident angle in the diffractive optical element in each of Embodiments 1 to 3.

FIG. 23 is a graph of diffraction efficiencies of the +1st order diffracted light for a light beam at a designed incident angle in the diffractive optical element in each of Embodiments 1 to 3. In other words, FIG. 23 illustrates an RCWA calculation result of the diffraction efficiencies of the +1st order diffracted light with wavelengths of 400 nm, 500 nm, and 700 nm at an incident angle of 0 degree with a grating pitch of 100 μm when the film width of the thin film changes with the refractive index and the grating height in each of For a wavelength longer than or equal to 650 nm, the width W of the thin film 11 is narrower than the cutoff width in a single mode represented by expression (10) for the TE polarization and by expression (11) for the TM polarization. Therefore, each of expressions (7) and (8) does not have any solution and thus the equivalent refractive index cannot be obtained.

Figure 24A:
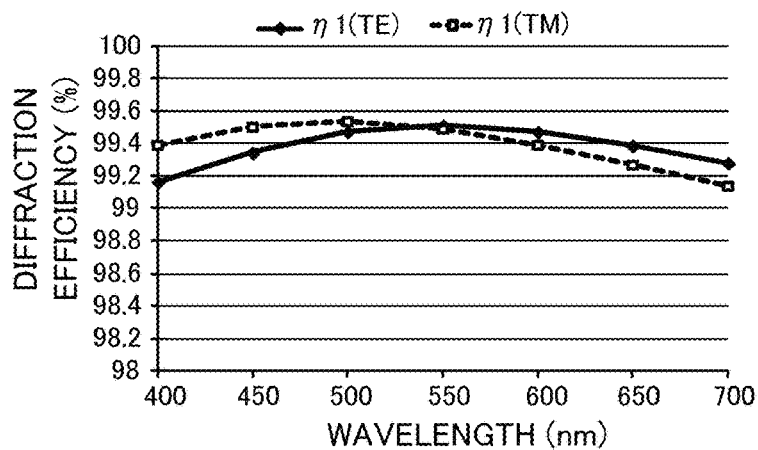
FIGS. 24A to 24C are graphs of diffraction efficiencies of +1st order diffracted light, 0th order diffracted light, and +2nd order diffracted light, respectively, for a light beam at a designed incident angle in a diffractive optical element of Embodiment 4.
Figure 24B:
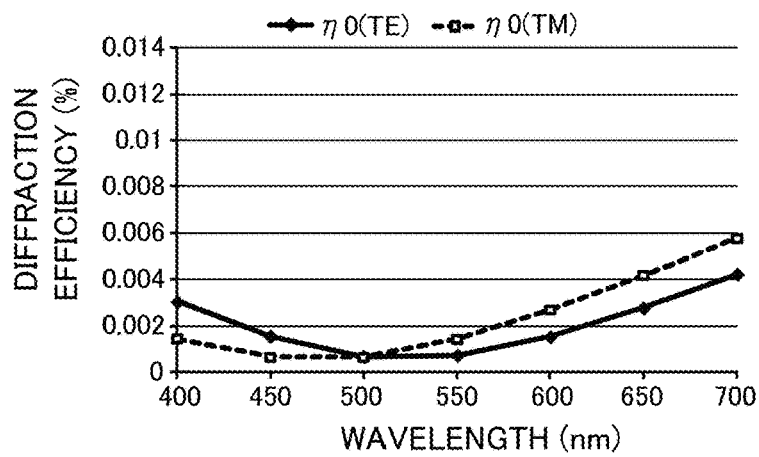
Figure 24C:
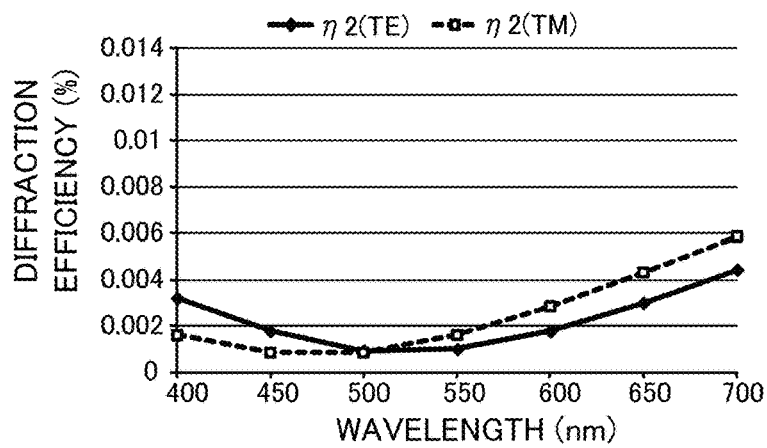

FIGS. 24A to 24C are graphs of diffraction efficiencies of the +1st order diffracted light, the 0th order diffracted light, and the +2nd order diffracted light, respectively, for a light beam at a designed incident angle in the diffractive optical element of this embodiment. In other words, FIGS. 24A to 24C illustrate an RCWA calculation result at an incident angle of 0 degree with a grating pitch of 100 μm. Compared with a conventional diffractive optical element, the diffraction efficiencies of the +1st diffracted light for both the TE polarization and the TM polarization are improved, and on the other hand, the diffraction efficiencies of the 0th order diffracted light and the +2nd order diffracted light are decreased over an entire visible wavelength band.

Figure 25A:
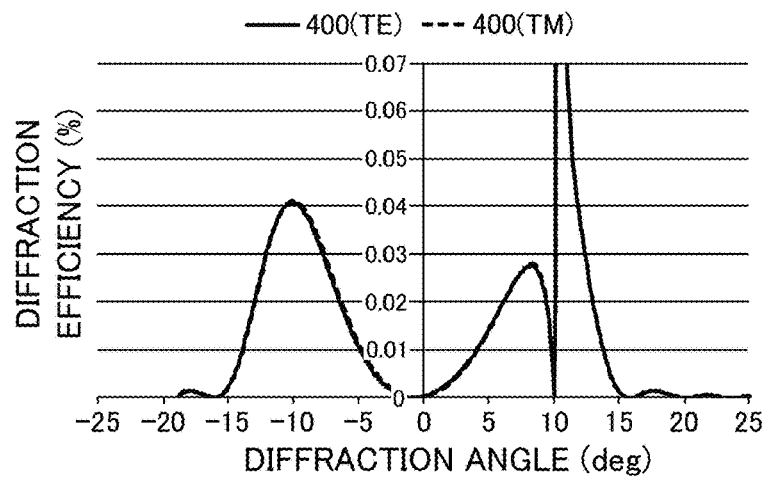
FIGS. 25A to 25C are graphs of diffraction efficiencies of wavelengths 400 nm, 550 nm, and 700 nm, respectively, for a light beam at an off-screen incident angle of +10 degrees in the diffractive optical element in Embodiment 4.
Figure 25B:
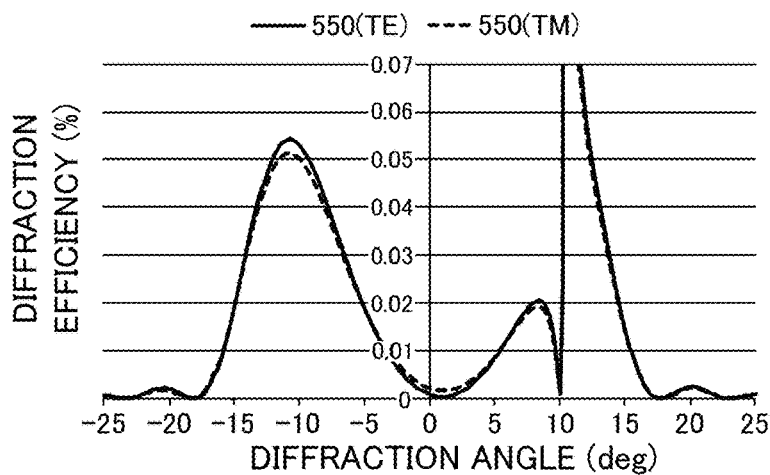
Figure 25C:
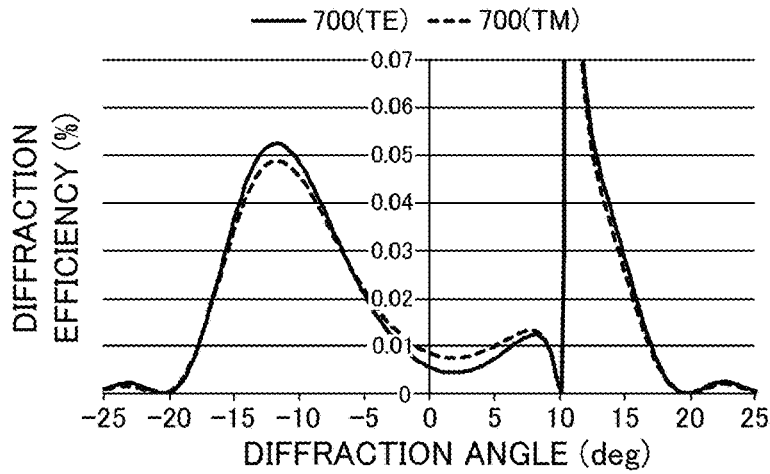

FIG. 25A to 25C are graphs of diffraction efficiencies of wavelengths 400 nm, 550 nm, and 700 nm, respectively, for a light beam at an off-screen incident angle of +10 degrees in the diffractive optical element of this embodiment. In other words, FIGS. 25A to 25C illustrate an RCWA calculation result at an incident angle of +10 degrees with a grating pitch of 100 μm. Compared with the conventional diffractive optical element, the diffraction efficiencies at the vicinity of the diffraction angle of +0.19 degree with respect to both the TE polarization and the TM polarization are decreased over the entire visible wavelength band.

Embodiment 5

Next, a diffractive optical element in Embodiment 5 of the present invention will be described. The diffractive optical element in this embodiment is different from the diffractive optical element in each of Embodiments 1 to 4, with respect to the refractive index $n_1$ and the width W of the thin film 11. In the diffractive optical element of this embodiment, the thin film 11 is constituted by a thin film of a material of $Al_2O_3$, and a thickness or the width W of the thin film 11 in a direction perpendicular to the grating wall surface as a lamination plane is 400 nm. An extinction coefficient of the thin film 11 in a wavelength band from 400 nm to 700 nm is not greater than 0.0003. Specifically, the extinction coefficient of the thin film 11 is maximized with respect to light having the wavelength of 400 nm, and the extinction coefficient for the wavelength of 400 nm is 0.0002. Other configurations of the diffractive optical element are the same as those in each of Embodiments 1 to 4. Table 5, similarly to Table 1, indicates parameters of the diffractive optical element and numerical values of respective expressions for each wavelength λ (nm) in this embodiment.

Figure 26A:
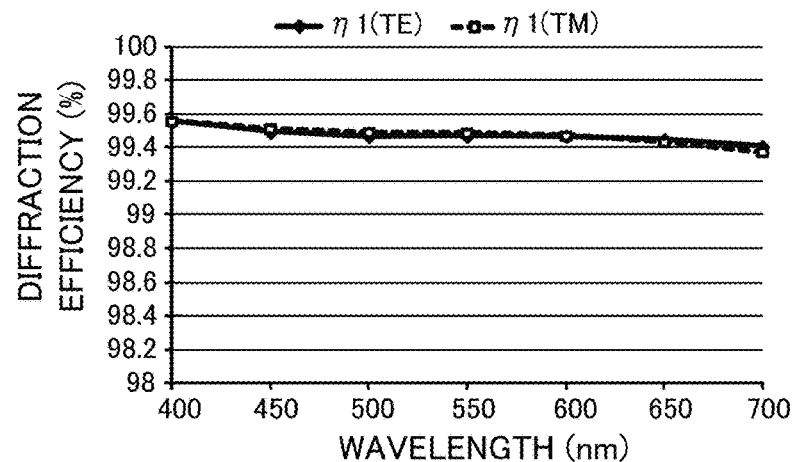
FIGS. 26A to 26C are graphs of diffraction efficiencies of +1st order diffracted light, 0th order diffracted light, and +2nd order diffracted light, respectively, for a light beam at a designed incident angle in a diffractive optical element of Embodiment 5.
Figure 26B:
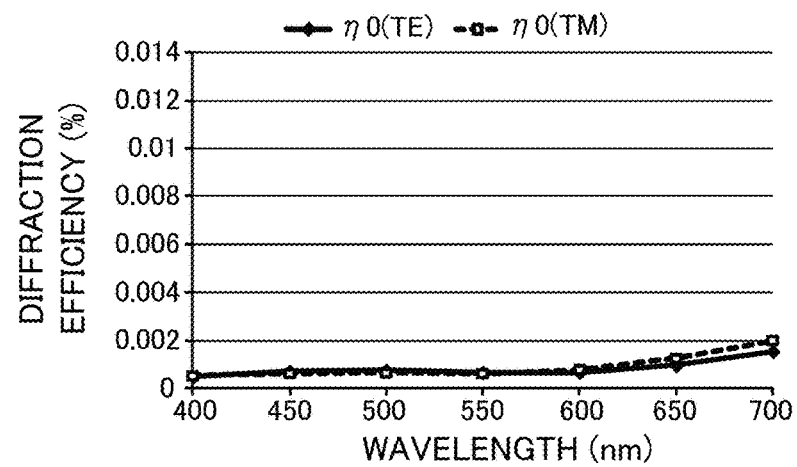
Figure 26C:
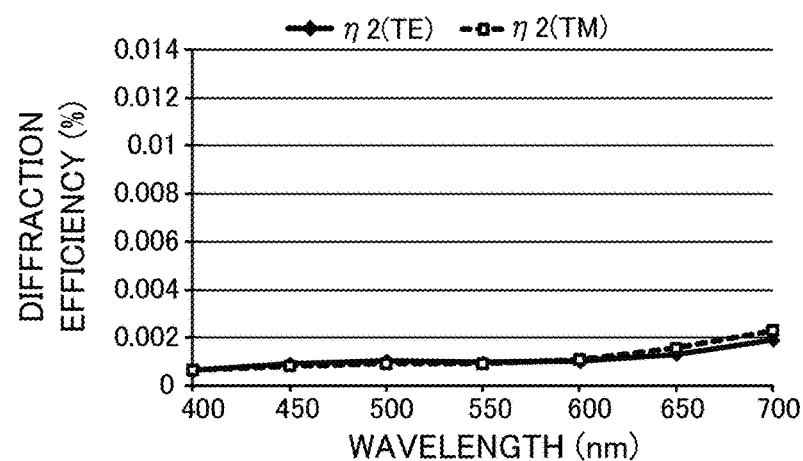

FIGS. 26A to 26C are graphs of diffraction efficiencies of the +1st order diffracted light, the 0th order diffracted light, and the +2nd order diffracted light, respectively, for a light beam at a designed incident angle in the diffractive optical element of this embodiment. In other words, FIGS. 26A to 26C illustrate an RCWA calculation result at an incident angle of 0 degree with a grating pitch of 100 μm. Compared with a conventional diffractive optical element, the diffraction efficiencies of the +1st diffracted light for both the TE polarization and the TM polarization are improved, and on the other hand, the diffraction efficiencies of the 0th order diffracted light and the +2nd order diffracted light are decreased over an entire visible wavelength band.

Figure 27A:
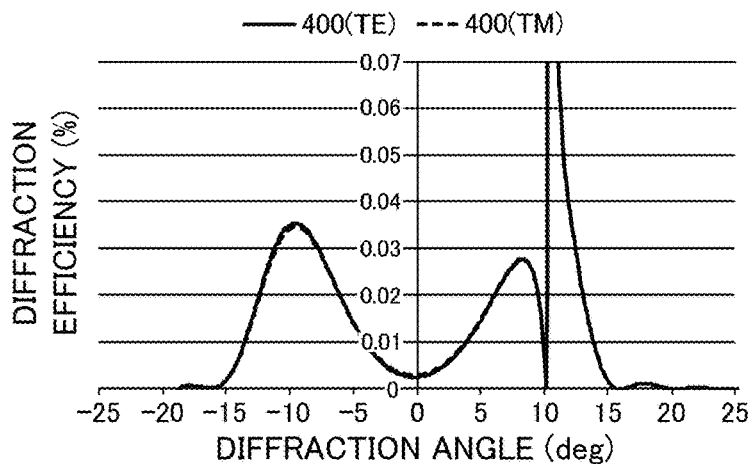
FIGS. 27A to 27C are graphs of diffraction efficiencies of wavelengths 400 nm, 550 nm, and 700 nm, respectively, for a light beam at an off-screen incident angle of +10 degrees in the diffractive optical element in Embodiment 5.
Figure 27B:
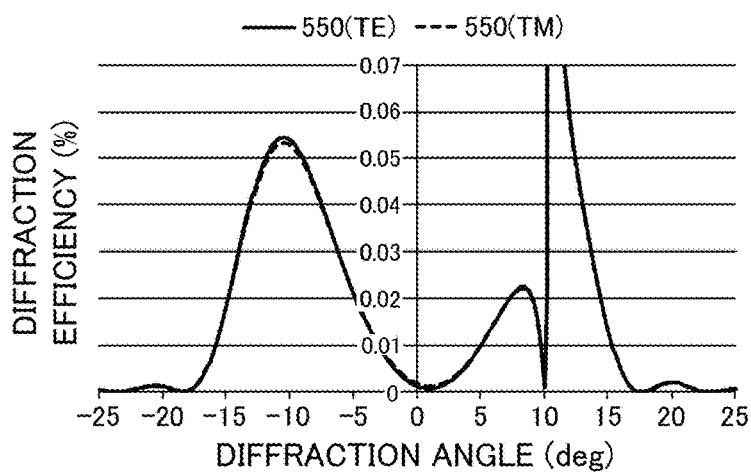
Figure 27C:
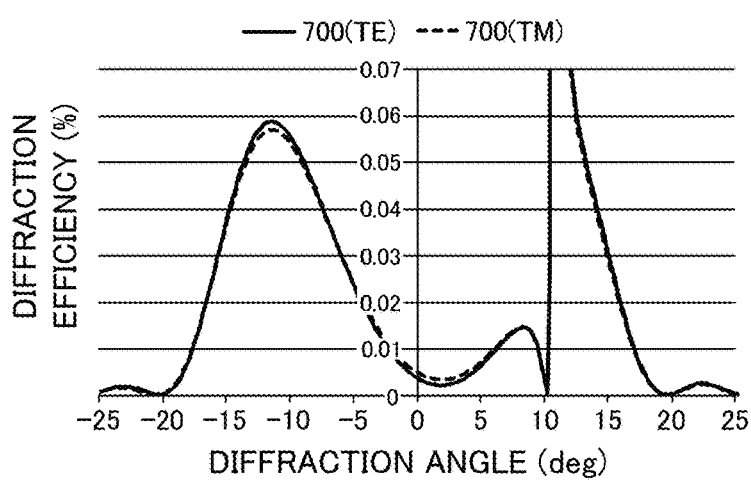

FIG. 27A to 27C are graphs of diffraction efficiencies of wavelengths 400 nm, 550 nm, and 700 nm, respectively, for a light beam at an off-screen incident angle of +10 degrees in the diffractive optical element of this embodiment. In other words, FIGS. 27A to 27C illustrate an RCWA calculation result at an incident angle of +10 degrees with a grating pitch of 100 μm. Compared with the conventional diffractive optical element, the diffraction efficiencies at the vicinity of the diffraction angle of +0.19 degree with respect to both the TE polarization and the TM polarization are decreased over the entire visible wavelength band.

Embodiment 6

Next, a diffractive optical element in Embodiment 6 of the present invention will be described. The diffractive optical element in this embodiment is different from the diffractive optical element in each of Embodiments 1 to 5, with respect to the diffraction grating, and the refractive index $n_1$ and the width W of the thin film 11.

In the diffractive optical element of this embodiment, the diffraction grating 21 is constituted by an ultraviolet curable resin which is mixed with $ZrO_2$ fine particles, and the diffraction grating 31 is constituted by an ultraviolet curable resin which is mixed with ITO fine particles. The refractive indices of the materials are higher than those in each of Embodiments 1 to 4, and the grating height d is 10.80 μm which is similar to that in each of Embodiments 1 to 4, and the designed order is +1st order. The thin film 11 is constituted by a thin film of a compound material of $Al_2O_3$ and $La_2O_3$, and a thickness or a width W of the thin film 11 in a direction perpendicular to the grating wall surface as a lamination plane is 340 nm. In this embodiment, the refrac-

TABLE 5

| | λ | | | | | | |
|---|---|---|---|---|---|---|---|
| | 400 | 450 | 500 | 550 | 600 | 650 | 700 |
| $n_1$ | 1.65858 | 1.65288 | 1.64884 | 1.64585 | 1.64353 | 1.64168 | 1.64018 |
| $n_2$ | 1.64626 | 1.63549 | 1.62822 | 1.62298 | 1.61903 | 1.61596 | 1.61352 |
| $n_3$ | 1.60919 | 1.59379 | 1.58189 | 1.57201 | 1.56343 | 1.55573 | 1.54865 |
| d (μm) | 10.79 | 10.79 | 10.79 | 10.79 | 10.79 | 10.79 | 10.79 |
| W (nm) | 400 | 400 | 400 | 400 | 400 | 400 | 400 |
| Δ | 0.0074 | 0.0105 | 0.0124 | 0.0138 | 0.0148 | 0.0155 | 0.0161 |
| Δ/λ | 0.0185 | 0.0233 | 0.0249 | 0.0251 | 0.0247 | 0.0239 | 0.0230 |
| a' | 2.9631 | 2.3556 | 2.2008 | 2.1787 | 2.2141 | 2.2801 | 2.3647 |
| $W_{c,TE}$ (nm) | 330 | 298 | 299 | 312 | 331 | 352 | 376 |
| $W_{c,TM}$ (nm) | 338 | 307 | 311 | 326 | 346 | 370 | 395 |
| $W_c$ (nm) | 334 | 302 | 305 | 319 | 338 | 361 | 386 |
| $W/W_c$ | 1.20 | 1.32 | 1.31 | 1.25 | 1.18 | 1.11 | 1.04 |
| $n_{eq,TE}$ | 1.64670 | 1.63674 | 1.62961 | 1.62413 | 1.61979 | 1.61634 | 1.61362 |
| $n_{eq,TM}$ | 1.64661 | 1.63652 | 1.62933 | 1.62382 | 1.61950 | 1.61612 | 1.61352 |
| $n_{eq}$ | 1.64666 | 1.63663 | 1.62947 | 1.62397 | 1.61965 | 1.61623 | 1.61357 |
| $(n_{eq} - n_2)d/λ$ | 0.0107 | 0.0273 | 0.0269 | 0.0195 | 0.0110 | 0.0044 | 0.0008 | tive indices of the materials of the diffraction grating and the thin film are higher than those in Embodiment 1, and the relative refractive index difference Δ is similar to that in Embodiment 1. An extinction coefficient of the thin film 11 in a wavelength band from 400 nm to 700 nm is not greater than 0.0003. Specifically, the extinction coefficient of the thin film 11 is maximized with respect to light having the wavelength of 400 nm, and the extinction coefficient for the wavelength of 400 nm is 0.0003. Table 6, similarly to Table 1, indicates parameters of the diffractive optical element and numerical values of respective expressions for each wavelength λ (nm) in this embodiment.

TABLE 6

| | λ | | | | | | |
|---|---|---|---|---|---|---|---|
| | 400 | 450 | 500 | 550 | 600 | 650 | 700 |
| $n_1$ | 1.73799 | 1.73044 | 1.72433 | 1.72006 | 1.71697 | 1.71445 | 1.71221 |
| $n_2$ | 1.71491 | 1.70527 | 1.69736 | 1.69192 | 1.68802 | 1.68480 | 1.68167 |
| $n_3$ | 1.67788 | 1.66360 | 1.65107 | 1.64099 | 1.63246 | 1.62461 | 1.61685 |
| d (μm) | 10.8 | 10.8 | 10.8 | 10.8 | 10.8 | 10.8 | 10.8 |
| W (nm) | 340 | 340 | 340 | 340 | 340 | 340 | 340 |
| Δ | 0.0132 | 0.0144 | 0.0155 | 0.0162 | 0.0167 | 0.0171 | 0.0177 |
| Δ/λ | 0.0330 | 0.0321 | 0.0310 | 0.0295 | 0.0279 | 0.0264 | 0.0253 |
| a' | 1.5767 | 1.6234 | 1.6798 | 1.7676 | 1.8711 | 1.9760 | 2.0622 |
| $W_{c,TE}$ (nm) | 203 | 221 | 239 | 262 | 286 | 310 | 333 |
| $W_{c,TM}$ (nm) | 210 | 230 | 250 | 274 | 300 | 327 | 351 |
| $W_c$ (nm) | 206 | 225 | 245 | 268 | 293 | 318 | 342 |
| $W/W_c$ | 1.65 | 1.51 | 1.39 | 1.27 | 1.16 | 1.07 | 0.99 |
| $n_{eq,TE}$ | 1.71869 | 1.70833 | 1.69966 | 1.69336 | 1.68872 | 1.68501 | 1.68168 |
| $n_{eq,TM}$ | 1.71832 | 1.70791 | 1.69921 | 1.69294 | 1.68840 | 1.68484 | — |
| $n_{eq}$ | 1.71850 | 1.70812 | 1.69944 | 1.69315 | 1.68856 | 1.68493 | — |
| $(n_{eq} - n_2)d/\lambda$ | 0.0970 | 0.0684 | 0.0448 | 0.0243 | 0.0098 | 0.0021 | — |

For a wavelength of 700 nm, the width W of the thin film 11 is narrower than the cutoff width in a single mode represented by expression (10) for the TE polarization and by expression (11) for the TM polarization. Therefore, each of expressions (7) and (8) does not have any solution and thus the equivalent refractive index cannot be obtained.

Figure 29A:
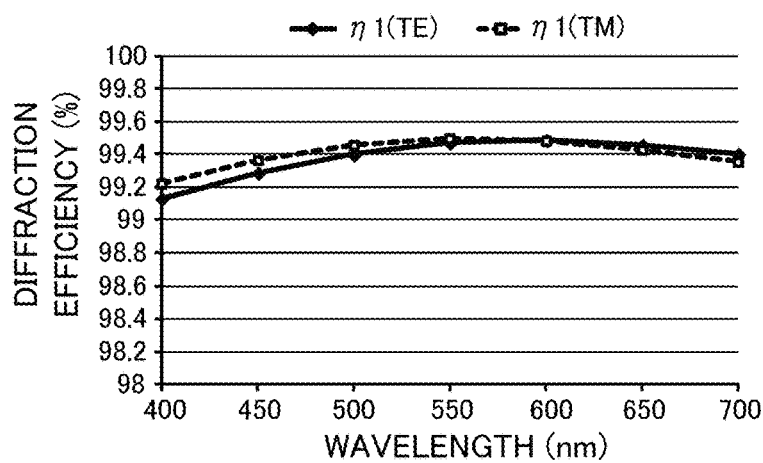
FIGS. 29A to 29C are graphs of diffraction efficiencies of +1st order diffracted light, 0th order diffracted light, and +2nd order diffracted light, respectively, for a light beam at a designed incident angle in a diffractive optical element of Embodiment 6.
Figure 29B:
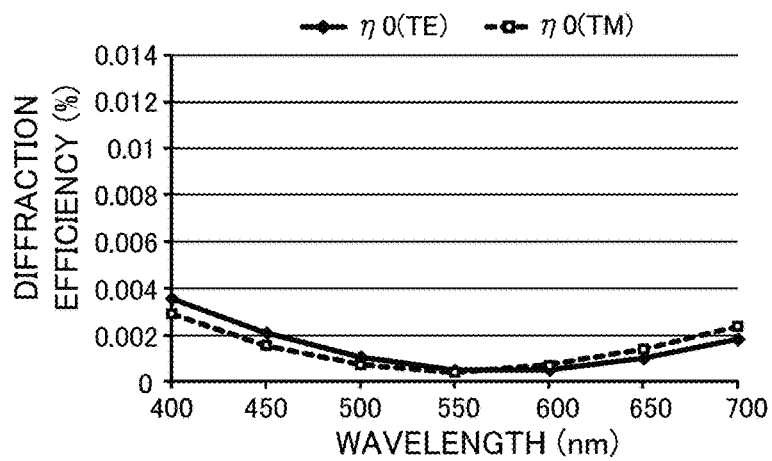
Figure 29C:
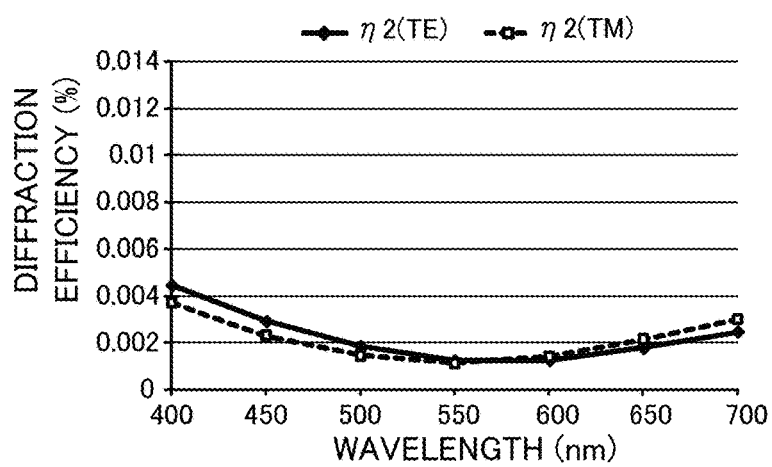
Figure 30A:
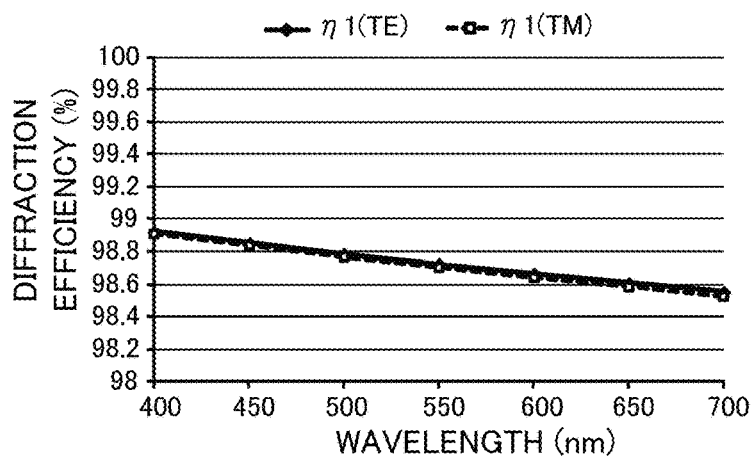
FIGS. 30A to 30C are graphs of diffraction efficiencies of +1st order diffracted light, 0th order diffracted light, and +2nd order diffracted light, respectively, for a light beam at a designed incident angle in a diffractive optical element as a comparative example.
Figure 30B:
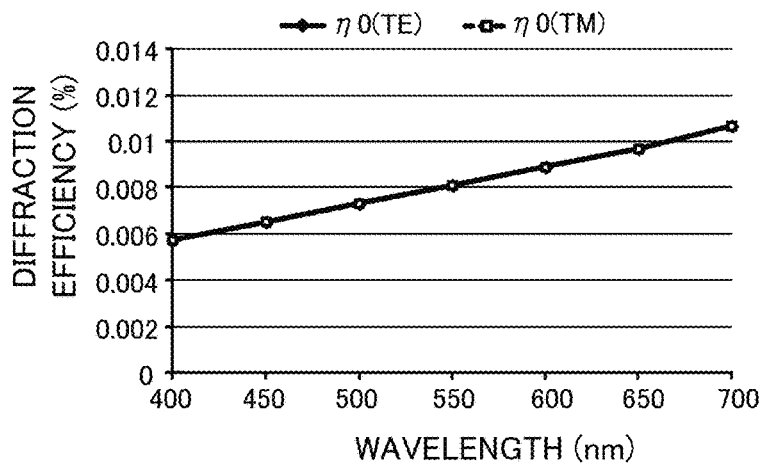
Figure 30C:
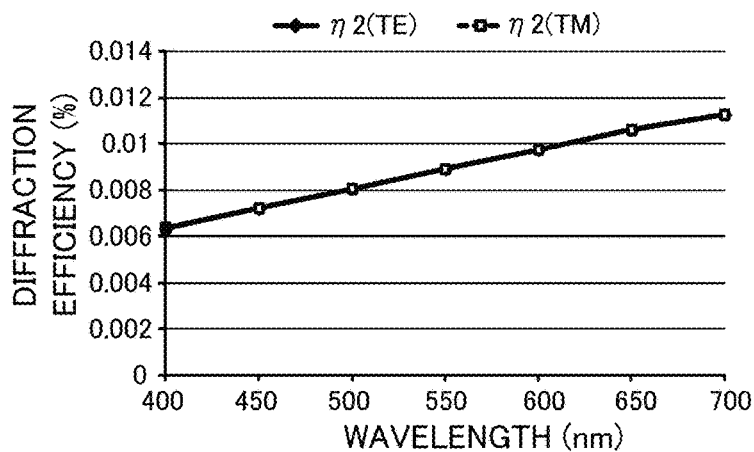

FIGS. 29A to 29C are graphs of diffraction efficiencies of the +1st order diffracted light, the 0th order diffracted light, and the +2nd order diffracted light, respectively, for a light beam at a designed incident angle in the diffractive optical element of this embodiment. In other words, FIGS. 29A to 29C illustrate an RCWA calculation result at an incident angle of 0 degree with a grating pitch of 100 μm. FIGS. 30A to 30C are graphs of diffraction efficiencies of the +1st order diffracted light, the 0th order diffracted light, and the +2nd order diffracted light, respectively, for a light beam at a designed incident angle in a diffractive optical element as a comparative example which has the same configuration as that of FIG. 1 except that the thin film 11 is not provided. In other words, FIGS. 30A to 30C are graphs, which correspond to FIGS. 29A to 29C, respectively, as a comparative example. Compared with the diffractive optical element without the thin film, the diffraction efficiencies of the +1st diffracted light for both the TE polarization and the TM polarization are improved, and on the other hand, the diffraction efficiencies of the 0th order diffracted light and the +2nd order diffracted light are decreased over an entire visible wavelength band.

Figure 31A:
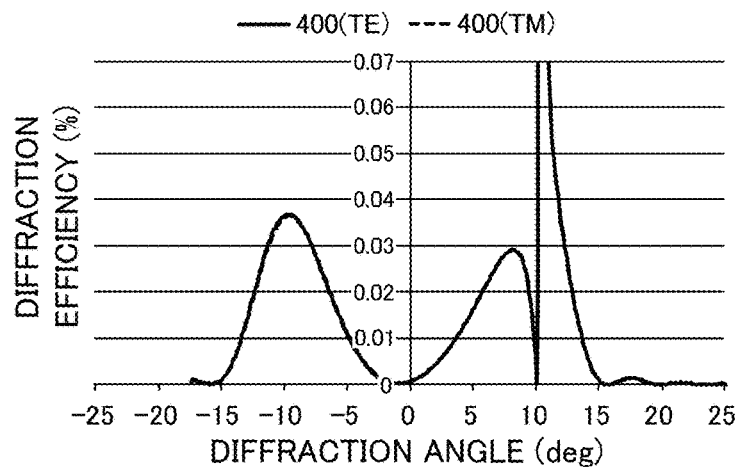
FIGS. 31A to 31C are graphs of diffraction efficiencies of wavelengths 400 nm, 550 nm, and 700 nm, respectively, for a light beam at an off-screen incident angle of +10 degrees in the diffractive optical element in Embodiment 6.
Figure 31B:
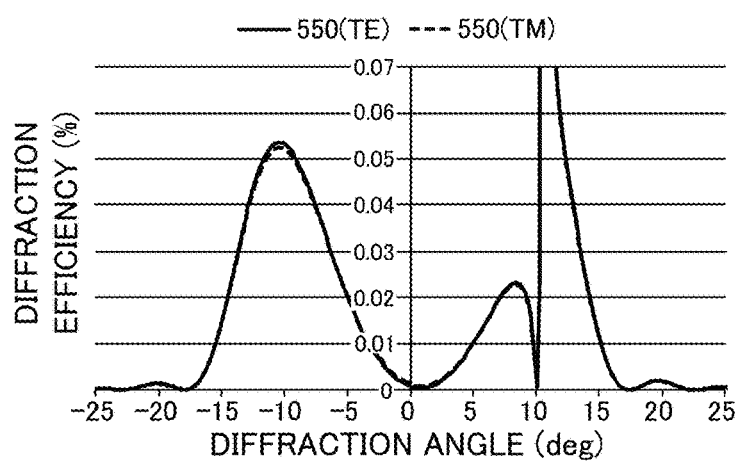
Figure 31C:
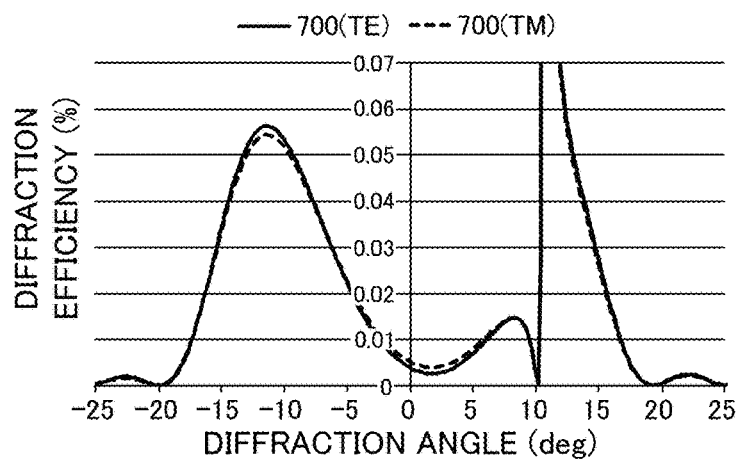
Figure 32A:
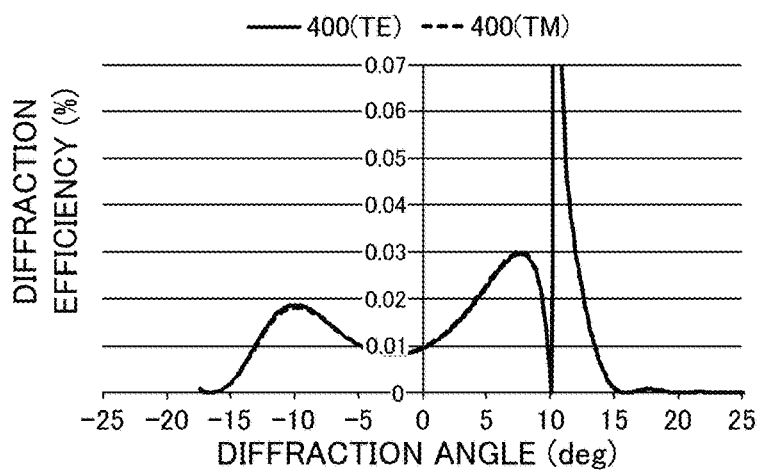
FIGS. 32A to 32C are graphs of diffraction efficiencies of wavelengths 400 nm, 550 nm, and 700 nm, respectively, for a light beam at an off-screen incident angle of +10 degrees in a diffractive optical element as a comparative example.
Figure 32B:
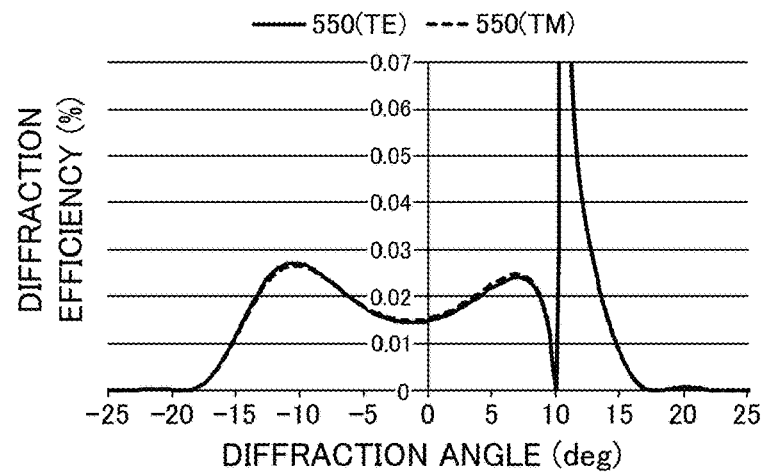
Figure 32C:
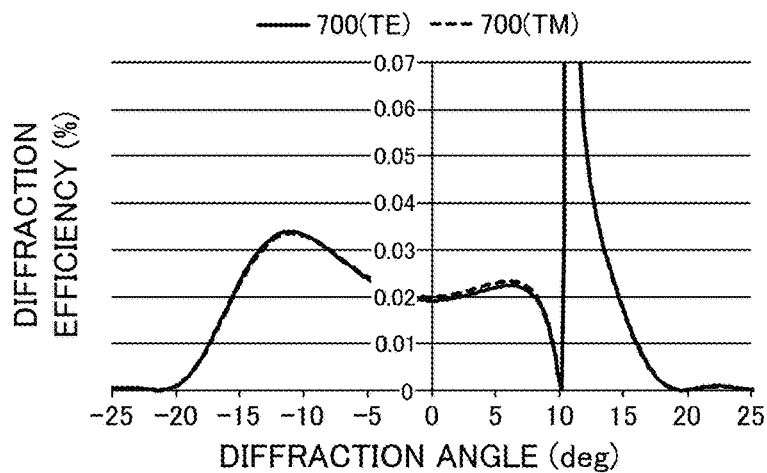

FIG. 31A to 31C are graphs of diffraction efficiencies of wavelengths 400 nm, 550 nm, and 700 nm, respectively, for a light beam at an off-screen incident angle of +10 degrees in the diffractive optical element of this embodiment. In other words, FIGS. 31A to 31C illustrate an RCWA calculation result at an incident angle of +10 degrees with a grating pitch of 100 μm. FIGS. 32A to 32C are graphs of diffraction efficiencies of the wavelengths 400 nm, 550 nm, and 700 nm, respectively, for a light beam at the off-screen incident angle of +10 degrees in a diffractive optical element as a comparative example which has the same configuration as that of FIG. 1 except that the thin film 11 is not provided. The spread of unnecessary light illustrated in FIGS. 31A to 31C is different from the spread of unnecessary light illustrated in FIGS. 32A to 32C, and compared with FIGS. 32A to 32C (the diffraction efficiencies of the diffractive optical element without the thin film), the diffraction efficiencies at the vicinity of the diffraction angle of +0.19 degree with respect to both the TE polarization and the TM polarization are decreased over the entire visible wavelength band.

Figure 33:
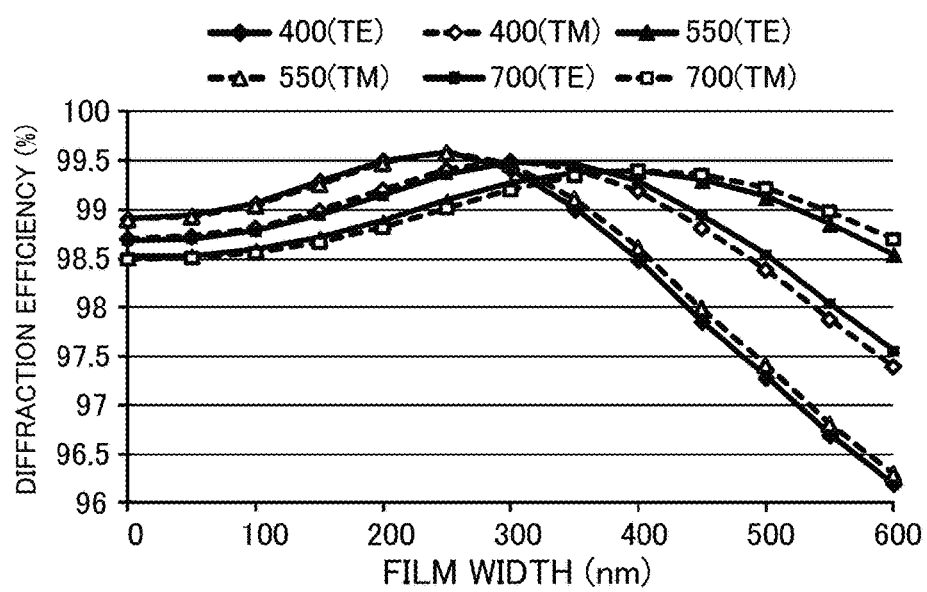
FIG. 33 is a graph of a diffraction efficiency of +1st order diffracted light for a light beam at a designed incident angle in the diffractive optical element in Embodiment 6.

FIG. 33 is a graph of diffraction efficiencies of the +1st order diffracted light for a light beam at a designed incident angle in the diffractive optical element of this embodiment. In other words, FIG. 33 illustrates an RCWA calculation result of the diffraction efficiencies of the +1st order diffracted light having the wavelength 400 nm, 550 nm, and 700 nm at an incident angle of 0 degree with a grating pitch of 100 μm when the film width of the thin film is changed with each refractive index and a grating height of this embodiment. Similarly to FIG. 23 described in each of Embodiments 1 to 3, the wavelength dependence and the polarization dependence are reduced.

This embodiment has a relationship, which is the same as the relationship in Embodiment 1, with the comparative example. In this embodiment, the refractive indices of the materials of the diffraction grating and the thin film are higher than those in Embodiment 1, and the relative refractive index difference Δ is similar to that in Embodiment 1. Thus, the diffractive optical element which reduces the wavelength dependence and the polarization dependence depends on the relative refractive index difference Δ instead of absolute values of the refractive indices of the diffraction grating and the thin film.

Comparing FIG. 23 with FIG. 33, it can be understood that FIG. 23 indicates the wavelength dependence lower than that in FIG. 33. Accordingly, it is preferred that the combination of the materials of the thin film and the diffraction grating with lower refractive indices is adopted to achieve a lower wavelength dependence.

According to the diffractive optical element in each embodiment, the diffraction efficiency of the designed order of the light beam incident at the designed incident angle can be improved and the diffraction efficiency of ±1st order as designed orders can be reduced, and unnecessary light reaching an imaging plane of unnecessary light caused by light beams incident at an obliquely incident angle (off-screen light incident angle) can be reduced. Furthermore, according to each embodiment, the diffractive optical element, the optical system, and the optical apparatus which reduce a wavelength dependence and a polarization dependence to have desired wavelength characteristics and polarization characteristics can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-099964, filed on May 15, 2015, and Japanese Patent Application No. 2016-084952, filed on Apr. 21, 2016, which are hereby incorporated by reference herein in their entirety.

What is claimed is:

1. A diffractive optical element comprising:
a first diffraction grating including a first grating surface and a first grating wall surface;
a second diffraction grating including a second grating surface and a second grating wall surface; and
a thin film consisting of a single film provided between the first grating wall surface and the second grating wall surface, the thin film being in direct physical contact with both of the first grating wall surface and the second grating wall surface,
wherein an extinction coefficient of the thin film with respect to a wavelength $\lambda$ in a use wavelength band is not greater than 0.0005, and
wherein the following expressions are satisfied:

$$n_1 > n_2 > n_3,$$

$$0.005 < \Delta < 0.045, \text{ and}$$

$$0.5 \leq W/W_C \leq 2.0,$$

where $n_1$, $n_2$, and $n_3$ are refractive indices of materials of the thin film, the first diffraction grating, and the second diffraction grating, respectively, with respect to the wavelength $\lambda$, and W is a width of the thin film between the first grating wall surface and the second grating wall surface, and
where $\Delta$ and $W_C$ are defined as follows:

$$\Delta = \frac{n_1^2 - n_2^2}{2n_1^2}$$

$$W_C = \frac{W_{C,TE} + W_{C,TM}}{2}$$

$$W_{C,TE} = \frac{1}{\kappa_C} \tan^{-1}\left(\frac{\delta_C}{\kappa_C}\right)$$

$$W_{C,TM} = \frac{1}{\kappa_C} \tan^{-1}\left(\frac{n_1^2 \delta_C}{n_3^2 \kappa_C}\right)$$

$$\kappa_C = k_0 \sqrt{n_1^2 - n_2^2}$$

$$\delta_C = k_0 \sqrt{n_2^2 - n_3^2}$$

$$k_0 = 2\pi/\lambda.$$

2. The diffractive optical element according to claim 1, wherein:
the following expression is satisfied:

$$0 \leq (n_{eq} - n_2) \times d/\lambda < 0.3,$$

where d is a grating height of each of the first diffraction grating and the second diffraction grating, and $n_{eq}$ is defined as follows:

$$n_{eq} = \frac{n_{eq,TE} + n_{eq,TM}}{2},$$

$$n_{eq,TE} = \beta_{TE}/k_0, \text{ and}$$

$$n_{eq,TM} = \beta_{TM}/k_0,$$

where $\beta_{TE}$ and $\beta_{TM}$ are propagation constants of the TE polarized light and the TM polarized light, respectively, and
wherein the propagation constants $\beta_{TE}$ and $\beta_{TM}$ satisfy the following expressions:

$$\tan(\kappa_{TE} W) = \frac{\kappa_{TE}(\gamma_{TE} + \delta_{TE})}{(\kappa_{TE}^2 - \gamma_{TE}\delta_{TE})}$$

$$\kappa_{TE} = \sqrt{k_0^2 n_1^2 - \beta_{TE}^2}$$

$$\gamma_{TE} = \sqrt{\beta_{TE}^2 - k_0^2 n_2^2}$$

$$\delta_{TE} = \sqrt{\beta_{TE}^2 - k_0^2 n_3^2}$$

$$\tan(\kappa_{TM} W) = \frac{n_1^2 \kappa_{TM}(n_3^2 \gamma_{TM} + n_2^2 \delta_{TM})}{(n_2^2 n_3^2 \kappa_{TM}^2 - n_1^4 \gamma_{TM} \delta_{TM})}$$

$$\kappa_{TM} = \sqrt{k_0^2 n_1^2 - \beta_{TM}^2}$$

$$\gamma_{TM} = \sqrt{\beta_{TM}^2 - k_0^2 n_2^2}$$

$$\delta_{TM} = \sqrt{\beta_{TM}^2 - k_0^2 n_3^2}$$

within a range where the width W of the thin film satisfies the following expressions:

$$W < \frac{W_{TE0} + W_{TM0}}{2}$$

$$W_{TE0} = \frac{\tan^{-1}\sqrt{a'} + \pi}{k_0 n_1 \sqrt{2\Delta}}$$

$$W_{TM0} = \frac{\tan^{-1}\left\{(n_1/n_2)^2 \sqrt{a'}\right\} + \pi}{k_0 n_1 \sqrt{2\Delta}}$$

$$a' = \frac{n_2^2 - n_3^2}{n_1^2 - n_2^2}.$$

3. The diffractive optical element according to claim 1, wherein a value of $\Delta$ relating to a first wavelength in the use wavelength band is smaller than a value of $\Delta$ relating to a second wavelength that is longer than the first wavelength.

4. The diffractive optical element according to claim 1, wherein the following expression is satisfied:

$$0.01 < \Delta/\lambda < 0.08,$$

where $\Delta/\lambda$ is expressed in $\mu m^{-1}$.

5. The diffractive optical element according to claim 1, wherein the use wavelength band is a visible wavelength band.

6. The diffractive optical element according to claim 1, wherein the Abbe number of the material of the thin film is larger than the Abbe number of the material of the second diffraction grating.

7. The diffractive optical element according to claim 1, wherein the following expression is satisfied:

$$1.64 < n_1 < 1.75.$$

8. The diffractive optical element according to claim 1, wherein the following expressions are satisfied:

$$vd2 > 35,$$

$$vd3 < 25, \text{ and}$$

$$0.960 \le k(n_2-n_3) \times d/(m \times \lambda) \le 1.040,$$

where vd2 and vd3 are the Abbe numbers of the materials of the first diffraction grating and the second diffraction grating, respectively, d is a grating height of each of the first diffraction grating and the second diffraction grating, and m is a designed order.

9. The diffractive optical element according to claim 1, wherein a grating height of each of the first diffraction grating and the second diffraction grating is not higher than 15 μm.

10. The diffractive optical element according to claim 1, wherein a designed order of the diffractive optical element is +1st order or −1st order.

11. The diffractive optical element according to claim 1, wherein the thin film is provided continuously from a position located between the first grating wall surface and the second grating wall surface to a position located between the first grating surface and the second grating surface.

12. The diffractive optical element according to claim 1, wherein the thin film is transparent to light having the wavelength in the use wavelength band.

13. The diffractive optical element according to claim 1, wherein:
the use wavelength band is from 400 nm to 700 nm, and
an extinction coefficient of the thin film is not greater than 0.0003 throughout the use wavelength band.

14. An optical system comprising:
an aperture stop; and
a diffractive optical element comprising:
  a first diffraction grating including a first grating surface and a first grating wall surface;
  a second diffraction grating including a second grating surface and a second grating wall surface; and
  a thin film consisting of a single film provided between the first grating wall surface and the second grating wall surface, the thin film being in direct physical contact with both of the first grating wall surface and the second grating wall surface,
wherein an extinction coefficient of the thin film with respect to a wavelength λ in a use wavelength band is not greater than 0.0005, and
wherein the following expressions are satisfied:

$$n_1 > n_2 > n_3,$$

$$0.005 < \Delta < 0.045, \text{ and}$$

$$0.5 \le W/W_C \le 2.0,$$

where $n_1$, $n_2$, and $n_3$ are refractive indices of materials of the thin film, the first diffraction grating, and the second diffraction grating, respectively, with respect to the wavelength λ, and W is a width of the thin film between the first grating wall surface and the second grating wall surface, and
where Δ and $W_C$ are defined as follows:

$$\Delta = \frac{n_1^2 - n_2^2}{2 n_1^2}$$

$$W_C = \frac{W_{C,TE} + W_{C,TM}}{2}$$

$$W_{C,TE} = \frac{1}{\kappa_C} \tan^{-1}\left(\frac{\delta_C}{\kappa_C}\right)$$

$$W_{C,TM} = \frac{1}{\kappa_C} \tan^{-1}\left(\frac{n_1^2 \delta_C}{n_3^2 \kappa_C}\right)$$

$$\kappa_C = k_0 \sqrt{n_1^2 - n_2^2}$$

$$\delta_C = k_0 \sqrt{n_2^2 - n_3^2}$$

$$k_0 = 2\pi/\lambda.$$

15. The optical system according to claim 14, wherein the aperture stop is disposed at an image side farther than the diffractive optical element.

16. An optical apparatus including an optical system comprising:
an aperture stop; and
a diffractive optical element comprising:
  a first diffraction grating including a first grating surface and a first grating wall surface;
  a second diffraction grating including a second grating surface and a second grating wall surface; and
  a thin film consisting of a single film provided between the first grating wall surface and the second grating wall surface, the thin film being in direct physical contact with both of the first grating wall surface and the second grating wall surface,
wherein an extinction coefficient of the thin film with respect to a wavelength λ in a use wavelength band is not greater than 0.0005, and
wherein the following expressions are satisfied:

$$n_1 > n_2 > n_3,$$

$$0.005 < \Delta < 0.045, \text{ and}$$

$$0.5 \le W/W_C \le 2.0,$$

where $n_1$, $n_2$, and $n_3$ are refractive indices of materials of the thin film, the first diffraction grating, and the second diffraction grating, respectively, with respect to the wavelength λ, and W is a width of the thin film between the first grating wall surface and the second grating wall surface, and
where Δ and $W_C$ are defined as follows:

$$\Delta = \frac{n_1^2 - n_2^2}{2 n_1^2}$$

$$W_C = \frac{W_{C,TE} + W_{C,TM}}{2}$$

$$W_{C,TE} = \frac{1}{\kappa_C} \tan^{-1}\left(\frac{\delta_C}{\kappa_C}\right)$$

$$W_{C,TM} = \frac{1}{\kappa_C} \tan^{-1}\left(\frac{n_1^2 \delta_C}{n_3^2 \kappa_C}\right)$$

$$\kappa_C = k_0 \sqrt{n_1^2 - n_2^2}$$

$$\delta_C = k_0 \sqrt{n_2^2 - n_3^2}$$

$$k_0 = 2\pi/\lambda.$$

17. The optical apparatus according to claim 16, wherein the aperture stop is disposed at an emission side that is opposite to an incident side where light is incident on the diffractive optical element.

* * * * *